US009565449B2

(12) United States Patent
Chen et al.

(10) Patent No.: US 9,565,449 B2
(45) Date of Patent: Feb. 7, 2017

(54) CODING MULTIVIEW VIDEO PLUS DEPTH CONTENT

(75) Inventors: Ying Chen, San Diego, CA (US); Rong Zhang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 13/414,515

(22) Filed: Mar. 7, 2012

(65) Prior Publication Data

US 2012/0229602 A1 Sep. 13, 2012

Related U.S. Application Data

(60) Provisional application No. 61/451,333, filed on Mar. 10, 2011, provisional application No. 61/487,587, filed on May 18, 2011.

(51) Int. Cl.
*H04N 13/00* (2006.01)
*H04N 19/597* (2014.01)

(52) U.S. Cl.
CPC .................................. *H04N 19/597* (2014.11)

(58) Field of Classification Search
CPC ..................... H04N 19/00769; H04N 19/597
USPC .......................................................... 348/43
See application file for complete search history.

(56) References Cited

U.S. PATENT DOCUMENTS 7,154,500 B2    12/2006  Heng et al.
2007/0110153 A1  5/2007  Cho et al.
2007/0121722 A1*  5/2007  Martinian et al. ....... 375/240.12
2007/0223595 A1*  9/2007  Hannuksela et al. .... 375/240.26
2008/0285863 A1  11/2008  Moon et al.
2009/0003447 A1*  1/2009  Christoffersen et al. ........................ 375/240.16
2010/0027619 A1*  2/2010  Doser et al. ............. 375/240.02

(Continued)

FOREIGN PATENT DOCUMENTS

JP    2008263528 A    10/2008
WO   2007020570 A2    2/2007

(Continued)

OTHER PUBLICATIONS

Anonymous, "3GPP TS 26.244," 3rd Generation Partnership Project, Version 9.1.0, Mar. 2010, 55 pp.

(Continued)

*Primary Examiner* — Christopher S Kelley
*Assistant Examiner* — Matthew Kwan
(74) *Attorney, Agent, or Firm* — Shumaker & Sieffert, P.A.

(57) ABSTRACT

This disclosure describes techniques for coding 3D video block units. In one example, a video encoder is configured to receive one or more texture components from at least a portion of an image representing a view of three dimensional video data, receive a depth map component for at least the portion of the image, code a block unit indicative of pixels of the one or more texture components for a portion of the image and the depth map component. The coding comprises receiving texture data for a temporal instance of a view of video data, receiving depth data corresponding to the texture data for the temporal instance of the view of video data, and encapsulating the texture data and the depth data in a view component for the temporal instance of the view, such that the texture data and the depth data are encapsulated within a common bitstream.

44 Claims, 9 Drawing Sheets

(56) References Cited

U.S. PATENT DOCUMENTS

| | | |
|---|---|---|
| 2010/0061452 A1 | 3/2010 | Pandit et al. |
| 2010/0098157 A1 | 4/2010 | Yang |
| 2010/0111183 A1 | 5/2010 | Jeon et al. |
| 2010/0231688 A1 | 9/2010 | Park et al. |
| 2010/0284466 A1 | 11/2010 | Pandit et al. |
| 2010/0295783 A1 | 11/2010 | El Dokor et al. |
| 2010/0309287 A1 | 12/2010 | Rodriguez |
| 2011/0216833 A1 | 9/2011 | Chen et al. |
| 2012/0162193 A1 | 6/2012 | Bae et al. |
| 2012/0200669 A1 | 8/2012 | Lai et al. |
| 2012/0236934 A1 | 9/2012 | Chen et al. |
| 2013/0027523 A1 | 1/2013 | Girdzijauskas et al. |

FOREIGN PATENT DOCUMENTS

| | | |
|---|---|---|
| WO | 2010043773 A1 | 4/2010 |
| WO | 2010073513 A1 | 7/2010 |
| WO | 2010085361 A2 | 7/2010 |
| WO | WO 2010126608 A2 | 11/2010 |

OTHER PUBLICATIONS

Singer, D. et al., "ISO/IEC 14496-15/FDIS," International Organization for Standardization, Coding of Moving Pictures and Audio, Aug. 11, 2003, 34 pp.

Anonymous, "Information technology—Generic coding of moving pictures and associated audio information: Systems," International Organization for Standardization, ISO/IEC 13818-1, Second Edition, Dec. 1, 2000, 174 pp.

Anonymous, "Information technology—Coding of audio-visual objects—Part 12: ISO base media file format," International Organization for Standardization, ISO/IEC 14496-12, Third Edition, Oct. 15, 2008, 120 pp.

Vetro, A. et al., "Joint Draft 8.0 on Multiview Video Coding," Joint Video Team of ISO/IEC MPEG & ITU-T VCEG, Document: JVT-AB204 (rev.1), Jul. 2008, 73 pp.

Anonymous, "3D Interface Specifications, White Paper," Philips Electronics Nederland B.V., Feb. 15, 2008, 29 pp.

Zhang, J. et al., "Joint Multiview Video Plus Depth Coding," IEEE 17th International Conference on Image Processing, Sep. 26-29, 2010, 4 pp.

"Draft Call for Proposals on 3D Video Coding Technology", Jan. 31, 2011, No. N11830, Jan. 31, 2011, XP030018324, ISSN: 0000-0002.

"Draft Report on Experimental Framework in 3D Video Coding", 93. MPEG Meeting; Jul. 26, 2010-Jul. 30, 2010; Geneva; (Motion Picture Expertgroup or ISO/IEC JTC1/SC29/WG11), No. N11478, Aug. 1, 2010, XP030017975, ISSN: 0000-0012.

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d2, 290 pp.

Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.

Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

Cho et al., "Effective Multiview Video Coding Using a Scalable Depth Map", International Conference on Computational Intelligence for Modelling Control and Automation, Dec. 10, 2008, pp. 255-259, IEEE, XP031496028, ISBN: 978-0-7695-3514-2, DOI: 10.1109/CIMCA.2008.69.

Fehn et al., "Proposed experimental conditions for EE4 in MPEG 3DAV", 62. MPEG Meeting; Oct. 21, 2002-Oct. 25, 2002; Shanghai; (Motion Pictureexpert Group or ISO/IEC JTC1/SC29/WG11) No. M9016, Oct. 15, 2002, XP030037952, ISSN: 0000-0271.

International Search Report and Written Opinion—PCT/US2012/028252—ISA/EPO—Jun. 19, 2012, 12 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Kim et al., "Stereoscopic video coding and disparity estimation for low bitrate applications based on MPEG-4 multiple auxiliary components", Signal Processing: Image Communication, Jul. 1, 2008, pp. 405-416, vol. 23, No. 6, Elsevier Science Publishers, XP022757530, ISSN: 0923-5965, DOI: 10.1016/J.IMAGE.2008.03.006 [retrieved on Apr. 15, 2008].

Lee et al., "Description of HEVC compatible 3D video coding technology by Samsung", 98. MPEG Meeting; Nov. 28, 2011-Dec. 2, 2011; Geneva; (Motion Picture Expert Group or ISO/IEC JTC1/SC29/WG11) No. m22633, Nov. 27, 2011, XP030051196.

Merkle et al.,"3D video coding: an overview of present and upcoming standards", Visual Communications and Image Processing; Nov. 7, 2010-Jul. 14, 2010; Huang Shan, An Hui, China, Jul. 11, 2010, XP030082162.

Schwarz et al., "Description of 3D Video Technology Proposal by Fraunhofer HHI (HEVC compatible, configuration B)", 98. MPEG Meeting; Nov. 28, 2011-Dec. 2, 2011; Geneva; (Motion Picture Expert Group or ISO/IEC JTC1/SC29/WG11), No. m22571, Nov. 22, 2011, XP030051134; 46 pages.

Schwarz et al., "Overview of the Scalable Video Coding Extension of the H.264/AVC Standard", IEEE Transactions on Circuits and Systems for Video Technology, Sep. 1, 2007, pp. 1103-1120, vol. 17, No. 9, IEEE Service Center, XP011193019, ISSN: 1051-8215, DOI: 10.1109/TCSVT.2007.905532.

Seo et al., "Motion information sharing mode for depth video coding", 3DTV-conference: The True Vision-Capture, Transmission and Display of 3D Video (3DTV-CON), 2010, Jun. 7, 2010, pp. 1-4, IEEE, XP031706528, ISBN: 978-1-4244-6377-0, DOI: 10.1109/3DTV.2010.5506505.

Smolic et al., "Development of a new MPEG standard for advanced 3D video applications", Proceedings of 6th International Symposium on Image and Signal Processing and Analysis (ISPA), Sep. 16, 2009, pp. 400-407, IEEE, XP031552049, ISBN: 978-953-184-135-1.

Sullivan G J, et al., "Video Compression—From Concepts to the H.264/AVC Standard" Proceedings of the IEEE, IEEE. New York, US LNKD—DOI:10.1109/JPROC.2004.839617, vol. 93, No. 1, Jan. 1, 2005 (Jan 1, 2005), pp. 18-31, XP011123850 ISSN: 0018-9219 the whole document.

Uchiumi et al., "Proposals on Applications and Requirements on 3D Video Coding", 95. MPEG Meeting; Jan. 24, 2011-Jan. 28, 2011; Daegu; (Motion Picture Expert Group or ISO/IEC JTC1/SC29/WG11), No. m19355, Jan. 20, 2011, XP030047922.

Wiegand, T., et al., "WD2: Working Draft 2 of High-Efficiency Video Coding", Jan. 28, 2011, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012].

Wiegand, T., et al., "WD3: Working Draft 3 of High-Efficiency Video Coding," Document JCTVC-E603, 5th Meeting: Geneva, CH, Mar. 16-23, 2011, pp. 193.

Wiegand, T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.

(56) References Cited

OTHER PUBLICATIONS

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.

Favalli et al., "Video transmission on heterogeneous networks," Universit'a degli studi di Pavia Facolt'a di Ingegneria, Ingegneria Elettronica, informatica ed elettrica, 2009/2010, 172 pp.

International Telecommunication Union, "ITU-T H.264, Series H: Audiovisual and Multimedia Systems, Infrastructure of audiovisual services—Coding of moving video, Advanced video coding for generic audiovisual services," Mar. 2010, 669 pp.

Text of ISO/IEC FDIS 23002-3 Representation of Auxiliary. Video and Supplemental information, ISO/IEC JTC 1/ SC29/WG11, MPEG Doc, N8768, Marrakech, Morocco, Jan. 2007.

Vetro et al., "Overview of Multiview Video Coding and Anti-Aliasing for 3D Displays," Mitsubishi Electric Research Labs, Department of Computer Science and Engineering, IEEE 2007, 4 pp.

Sullivan et al., "Editors' draft revision to ITU-T Rec. H.264 | ISO/IEC 14496-10 Advanced Video Coding—in preparation for ITU-T SG 16 AAP Consent (in integrated form)", Joint Video Team (JVT) of ISO/IEC MPEG & ITU-T VCEG (ISO/IEC JTC1/SC29/WG11 and ITU-T SG16 Q.6) 30th Meeting: Geneva, CH, Jan. 29-Feb. 3, 2009, pp. 1-683.

McCann et al., "Samsung's Response to the Call for Proposals on Video Compression Technology," Joint Collaborative Team on Video Coding (JCT-VC) of ITU-T SG-16 WP3 and ISO/IEC JTC1/SC29/WG11, 1st meeting, Document: JCTVC-A124, Dresden, DE, Apr. 15-23, 2010, 42 pp.

"Applications and Requirements on 3D video Coding," Video and Requirements, ISO/IEC JTC1/SC29/WG11, MPEG2011/N12035, Mar. 2011, 7 pp.

\* cited by examiner

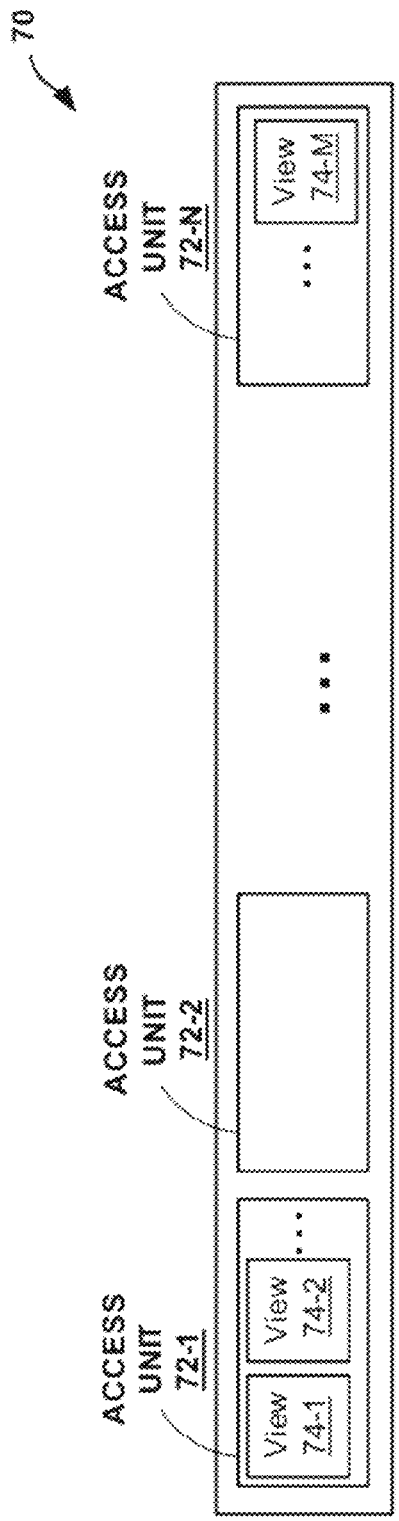
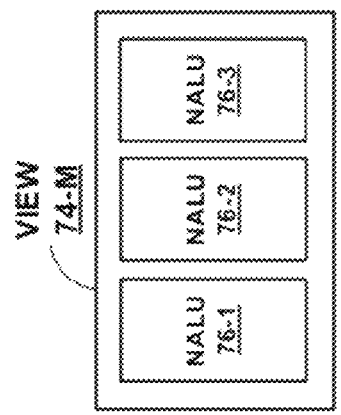
FIG. 3A
FIG. 3B

CODING MULTIVIEW VIDEO PLUS DEPTH CONTENT

This application relates to U.S. Provisional Application No. 61/451,333, filed Mar. 10, 2011, and U.S. Provisional Application No. 61/487,587, filed May 18, 2011, each of which is hereby incorporated by reference in its entirety.

TECHNICAL FIELD

This disclosure relates to the field of video coding, specifically, 3-dimensional video content coding.

BACKGROUND

Digital video capabilities can be incorporated into a wide range of devices, including digital televisions, digital direct broadcast systems, wireless communication devices such as radio telephone handsets, wireless broadcast systems, personal digital assistants (PDAs), laptop or desktop computers, digital cameras, digital recording devices, video gaming devices, video game consoles, and the like. Digital video devices implement video compression techniques, such as MPEG-2, MPEG-4, or H.264/MPEG-4, Part 10, Advanced Video Coding (AVC), to transmit and receive digital video more efficiently. Video compression techniques perform spatial and temporal prediction to reduce or remove redundancy inherent in video sequences.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

Efforts have been made to develop new video coding standards based on H.264/AVC. One such standard is the scalable video coding (SVC) standard, which is the scalable extension to H.264/AVC. Another standard is the multi-view video coding (MVC), which has become the multiview extension to H.264/AVC. A joint draft of MVC is in described in JVT-AB204, "Joint Draft 8.0 on Multiview Video Coding," 28th JVT meeting, Hannover, Germany, July 2008, available at http://wftp3.itu.int/av-arch/jvt-site/2008_07_Hannover/JVT-AB204.zip. A version of the AVC standard is described in JVT-AD007, "Editors' draft revision to ITU-T Rec. H.264|ISO/IEC 14496-10 Advanced Video Coding—in preparation for ITU-T SG 16 AAP Consent (in integrated form)," 30th JVT meeting, Geneva, CH, February 2009," available from http://wftp3.itu.int/av-arch/jvt-site/2009_01_Geneva/JVT-AD007.zip. This document integrates SVC and MVC in the AVC specification.

SUMMARY

In general, this disclosure describes techniques for supporting coding of video data including texture and depth information. Texture information refers to information for rendering a two-dimensional picture, such as luminance (brightness) and chrominance (color) information. Depth information may include information useful in forming three-dimensional video, such as a depth map (e.g., depth values on a per-pixel basis) or a parallax map (e.g., horizontal disparity on a per-pixel basis).

In general, this disclosure describes techniques for supporting three-dimensional (3D) video rendering. In particular, the techniques of this disclosure relate to coding and decoding 3D video content having texture and depth components. This disclosure also proposes signaling techniques for video data. Depth components may be from a depth map of an image. In 3D image rendering, depth maps include depth components and can be used for generating virtual views from a provided viewing perspective. The signaling techniques may include signaling the texture and depth view components, prediction dependency of depth view components, the dependency of depth view component and its corresponding texture view component within a view component, and whether a texture view component may depend on depth view component of other time instance for e.g., view synthesis prediction. The signaling may also include providing camera parameters associated with each view. Coded block units, also referred to simply as "coded blocks" in this disclosure, may correspond to macroblocks in ITU-T H.264/AVC (Advanced Video Coding) or coding units of High Efficiency Video Coding (HEVC).

In one example of this disclosure, texture NAL and depth NAL of a view component may be organized in a consecutive manner (e.g., VCL NAL unit coding order). In some examples, signaling techniques may be utilized, which may include for example, indicating with a new NAL unit type or in the NAL unit header whether the NAL unit belongs to a depth view component, predicting from the texture view component to the corresponding depth view component. In other examples, parameters related to camera and depth content may be signaled. The parameters may include, for example, common intrinsic camera parameters and extrinsic camera parameters, mapping from quantized depth value to real-world depth value, different extrinsic camera parameters (e.g., the translation of each view), and so forth.

In one example, the disclosure is directed to a method of coding video data, the method comprising receiving a texture view component comprising texture data for a temporal instance of a view of video data, receiving a depth view component comprising depth data corresponding to the texture data for the temporal instance of the view of video data, and encapsulating the texture view component and the depth view component in a view component for the temporal instance of the view, such that the texture view component and the depth view component are encapsulated within a common bitstream.

In another example, the disclosure is directed to a device for processing video data comprising a video coder configured to receive a texture view component comprising texture data for a temporal instance of a view of video data, receive a depth view component comprising depth data corresponding to the texture data for the temporal instance of the view of video data, and encapsulate the view component texture and the depth view component in a view component for the temporal instance of the view, such that the texture view component and the depth view component are encapsulated within a common bitstream.

In yet another example, this disclosure is directed to a device for processing video data, comprising means for receiving a texture view component comprising texture data for a temporal instance of a view of video data, means for receiving a depth view component comprising depth data corresponding to the texture data for the temporal instance of the view of video data, and means for encapsulating the texture view component and the depth view component in a view component for the temporal instance of the view, such that the texture view component and the depth view component are encapsulated within a common bitstream.

The techniques described in this disclosure may be implemented in hardware, software, firmware, or any combination thereof. If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. Software comprising instructions to execute the techniques may be initially stored in a computer-readable medium and loaded and executed by a processor.

Accordingly, this disclosure is also directed to a computer program product comprising a computer-readable storage medium having stored thereon instructions that, when executed, cause a processor of a video encoding device to receive a texture view component comprising texture data for a temporal instance of a view of video data, receive a depth view component comprising depth data corresponding to the texture data for the temporal instance of the view of video data, and encapsulate the view component texture and the depth view component in a view component for the temporal instance of the view, such that the texture view component and the depth view component are encapsulated within a common bitstream.

In another example, this disclosure is directed to a method of coding video data, the method comprising receiving a common bitstream encapsulating a texture view component and a depth view component in a view component for a temporal instance of the view of video data, wherein the texture view component comprises texture data for the temporal instance of a view and the depth view component comprising depth data corresponding to the texture data for the temporal instance of the view of video data, and separating the texture view component and the depth view component for the temporal instance of the view of video data.

In yet another example, this disclosure is directed to a device for processing video data comprising a video coder configured to receive a common bitstream encapsulating a texture view component and a depth view component in a view component for a temporal instance of the view of video data, wherein the texture view component comprises texture data for the temporal instance of a view and the depth view component comprising depth data corresponding to the texture data for the temporal instance of the view of video data, and separate the texture view component and the depth view component for the temporal instance of the view of video data.

In another example, this disclosure is directed to device for processing video data comprising means for receiving a common bitstream encapsulating a texture view component and a depth view component in a view component for a temporal instance of the view of video data, wherein the texture view component comprises texture data for the temporal instance of a view and the depth view component comprising depth data corresponding to the texture data for the temporal instance of the view of video data, and means for separating the texture view component and the depth view component for the temporal instance of the view of video data.

In yet another example, this disclosure is directed to computer program product comprising a computer-readable storage medium having stored thereon instructions that, when executed, cause a processor of a video decoding device to receive a common bitstream encapsulating a texture view component and a depth view component in a view component for a temporal instance of the view of video data, wherein the texture view component comprises texture data for the temporal instance of a view and the depth view component comprising depth data corresponding to the texture data for the temporal instance of the view of video data, and separate the texture view component and the depth view component for the temporal instance of the view of video data.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 3A is a conceptual diagram illustrating an example of a bitstream structure that may be used in an implementation of one or more of the techniques of this disclosure.

FIG. 3B is a conceptual diagram illustrating an example of a view that may be included in the bitstream structure of FIG. 3A.

DETAILED DESCRIPTION

This disclosure describes techniques for supporting coding of video data including texture and depth information. Texture information refers to information for rendering a two-dimensional (2D) picture, such as luminance (brightness) and chrominance (color) information. Depth information may include information useful in forming 3D video, such as a depth map (e.g., depth values on a per-pixel basis) or a parallax map (e.g., horizontal disparity on a per-pixel basis).

The described techniques are related to coding of three-dimensional (3D) video content. In particular, these techniques are directed to providing depth components for texture components of one or more views of an MVC bitstream. The 3D video content may be represented, for example, as multiview video-plus depth (MVD) data. That is, these techniques may be applied to encode a bitstream resembling a multiview video coding (MVC) bitstream, where any or all views of the MVC bitstream may further include depth information, e.g., depth view components.

Video conversion based on depth estimation and virtual view synthesis may be used to create 3D image, such as 3D video applications. In particular, virtual views of a scene may be used to create a 3D view of the scene. Generation of a virtual view of a scene based on an existing view of the scene is conventionally achieved by estimating object depth values before synthesizing the virtual view. Depth estimation is the process of estimating absolute or relative distances between objects and the camera plane from stereo pairs or monoscopic content. Depth information may include information useful in forming three-dimensional video, such as a depth map (e.g., depth values on a per-pixel basis) or a parallax map (e.g., horizontal disparity on a per-pixel basis).

The estimated depth information, usually represented by a grey-level image depth map, can be used to generate arbitrary angle of virtual views using depth image based rendering (DIBR) techniques. Compared to the traditional three-dimensional television (3DTV) systems where multi-view sequences face the challenges of efficient inter-view compression, a depth map based system may reduce the usage of bandwidth by transmitting only one or a few views together with the depth map(s), which can be efficiently encoded. The depth map(s) used in depth map based conversion may be controllable (e.g., through scaling) by end users before it is used in view synthesis. Customized virtual views may be generated with different amount of perceived depth. Also, an estimation of depth can be performed using monoscopic video wherein only a one-view 2D content is available.

Figure 4A:
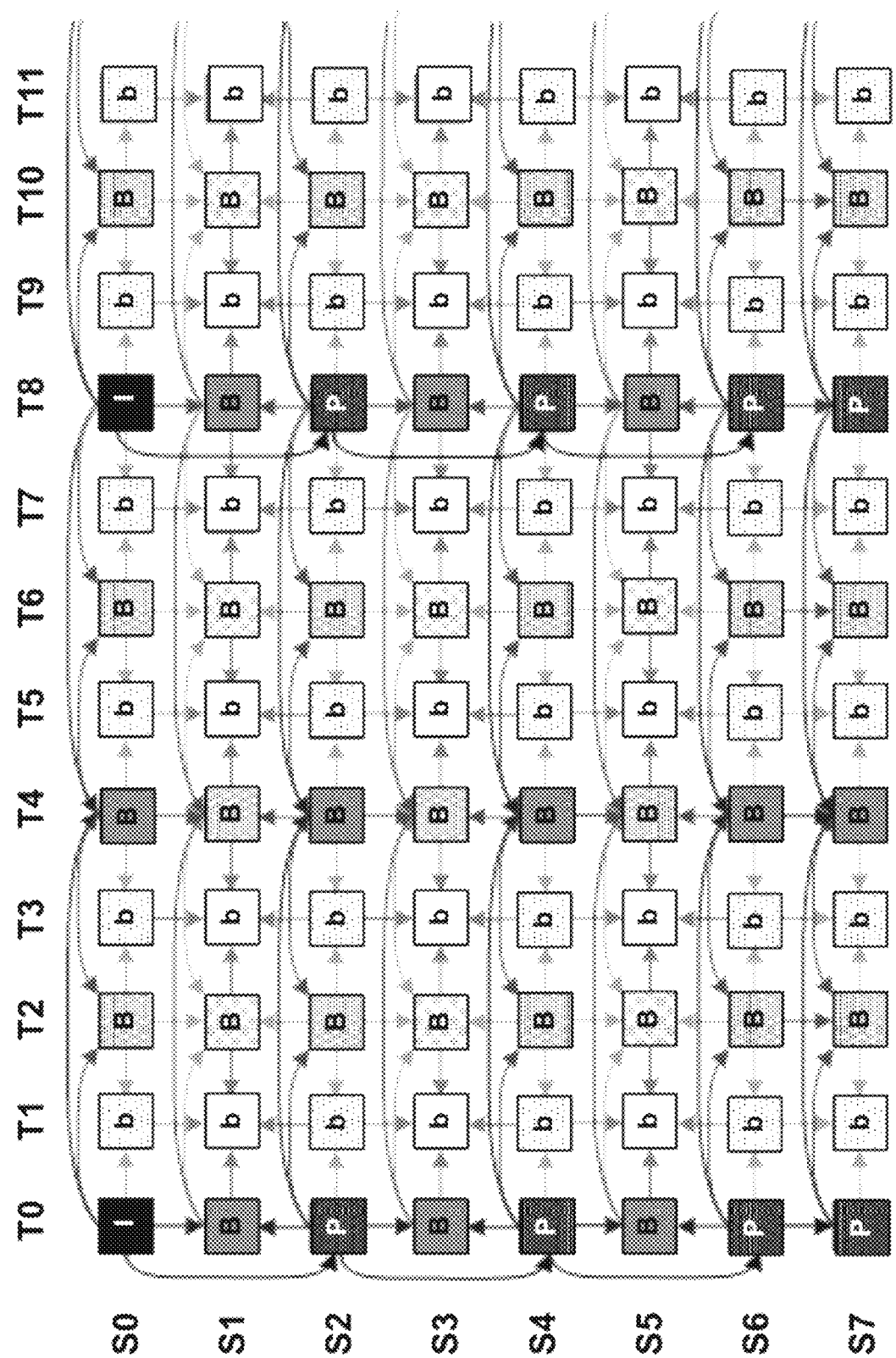
FIG. 4A is a conceptual diagram illustrating an example MVC prediction pattern.

MVC is an extension of the ITU-T H.264 encoding standard that supports encoding of two or more views of a scene. An MVC extension of HEVC has also been proposed. When capturing raw video data, two or more cameras may be active during filming of a scene, and each of the cameras may produce data for a respective view from a different perspective. In accordance with MVC, each of the views may be encoded, and the views may be encoded using pictures of other coded views as reference pictures (inter-view prediction) as well as other pictures of the same view as reference pictures (temporal prediction), as illustrated in FIG. 4A.

The different views, captured by the two or more cameras, may be used to support 3D video data. Two views may be displayed simultaneously using different polarizations of light, and a viewer may wear passive, polarized glasses such that each of the viewer's eyes receives a respective one of the views. Alternatively, the viewer may wear active glasses that shutter each eye independently, and a display may rapidly alternate between images of each eye in synchronization with the glasses. Some displays are capable of displaying as many as eight or even more views, so that users may observe the display from various angles to view the scene from various perspectives.

The techniques involve coding both texture and depth information in a common bitstream for the same view. A video decoder may generate one or more additional views from the texture and depth information of an encoded view. Therefore, rather than encoding a full set of eight views, for example, an encoder in accordance with the techniques of this disclosure may encode, for example, four views, including texture and depth information for each view. In this disclosure, the term "coding" may refer to either or both of encoding and/or decoding.

More specifically, the techniques of this disclosure are directed to supporting coding of texture and depth information of the same view within the same bitstream. Existing techniques for coding texture and depth information are directed to providing the texture and depth information in separate bitstreams.

In one aspect of this disclosure, the text and depth information may be coded as separate components of the same bitstream, which may allow the two components to be easily separated from each other. As a result, when the bitstream is forwarded to display devices, the bitstream may be adjusted according to the capabilities of the display device. For example, the bitstream including both components may be forwarded to 3D-ready devices, while the bitstream may be filtered and forwarded to 2D-ready devices without including the depth information component.

More particularly, this disclosure proposes providing data for a view of video data such that a view component of the view includes both texture and depth information. A view component is a unit of data that includes all data for a common temporal instance for a particular view. A network abstraction layer (NAL) unit at the video coding layer (VCL), also referred to as a VCL NAL unit, may include a slice or frame of coded video data, e.g., texture or depth data. Techniques of this disclosure propose treating texture and depth VCL NAL units for a common temporal instance as belonging to a common view component.

In accordance with the techniques of this disclosure, by providing texture and depth VCL NAL units for a common temporal instance in the same view component, certain coding data for the texture information may be reused for coding the depth information. For example, a depth map for a VCL NAL unit may be predicted from the corresponding texture information using displacement vectors. As with conventional MVC, inter-view prediction may also be available for coding texture information of views relative to texture information of other views.

Additionally, this disclosure provides techniques for signaling camera parameters for views that are provided, and using the camera parameters in view synthesis prediction. Using the camera parameters, a video decoder can synthesize a virtual view from a reference view and corresponding depth map using, for example, depth image based rendering (DIBR). The synthesized virtual view may be used as a prediction for encoding another view. In one example, the reference view may be the depth map itself. In this manner, camera parameters and one reference depth map may be sufficient to synthesize a virtual current depth map.

Techniques described herein may be applied to encode texture and depth components and encapsulate them together into a single bitstream. Texture and depth components associated with a single view at a single instant of time may be encoded together and associated with a video data unit, e.g., video frame or slice. In accordance with the techniques of this disclosure, a video encoder may reuse prediction data associated with the texture component of a view to code the depth component of the view. In this manner, the encoder may encode texture and depth components using prediction dependencies between the two components or two views, or on synthesized views, and signal the prediction dependencies that will be useful in coding the video data. Additionally, this disclosure may provide techniques of inter-view prediction for coding texture information of views relative to texture information of other views.

These and other techniques of this disclosure may be described in more detail below.

Figure 1:
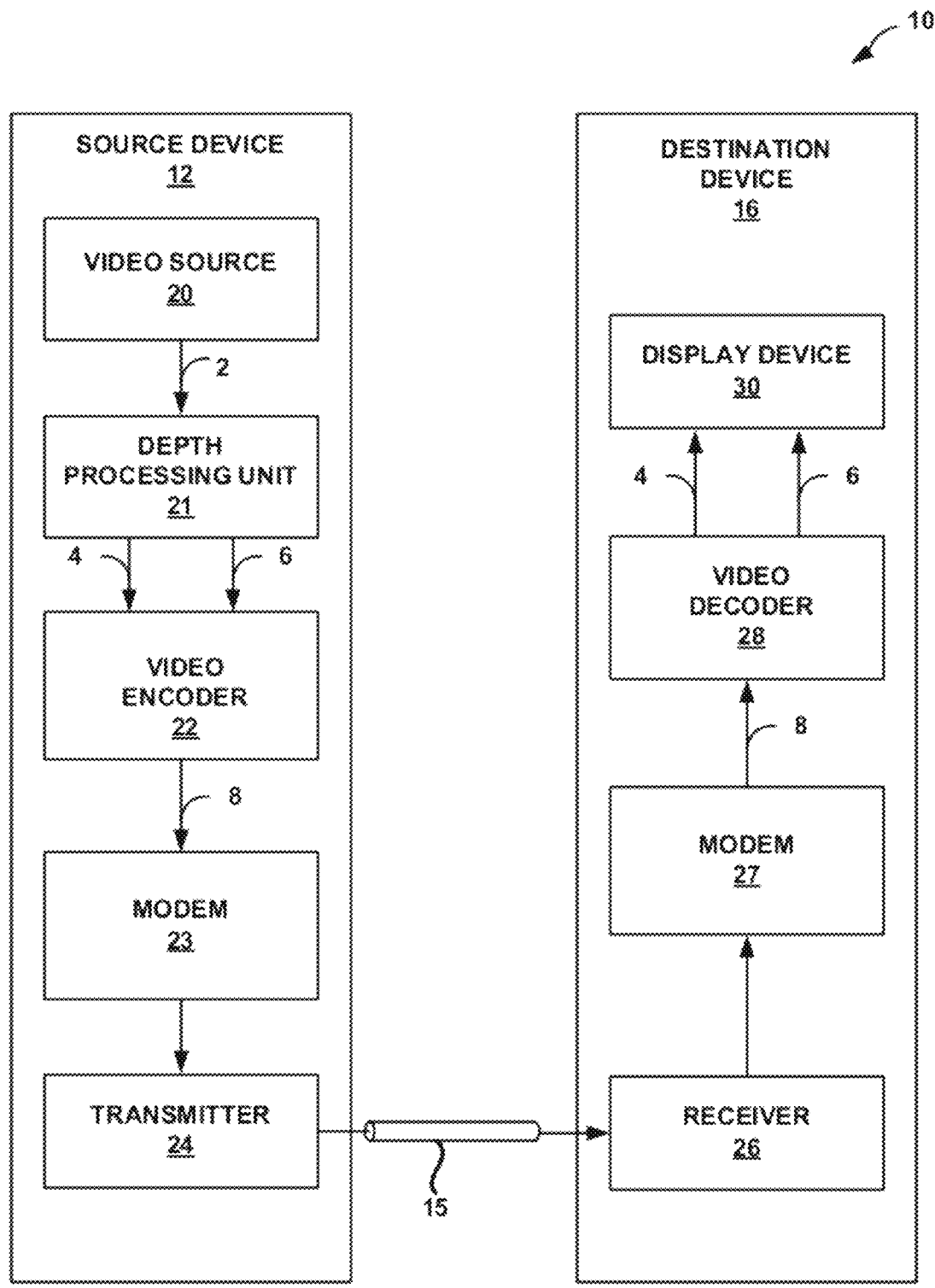
FIG. 1 is a block diagram illustrating one example of a video encoding and decoding system that may be used to implement one or more of the techniques of this disclosure.

FIG. 1 is a block diagram illustrating one example of a video encoding and decoding system 10 that may be used to implement one or more of the techniques of this disclosure. As FIG. 1 shows, system 10 includes a source device 12 that transmits encoded video to a destination device 16 via a communication channel 15. Source device 12 and destination device 16 may comprise any of a wide range of devices. In some cases, either or both of source device 12 and destination device 16 may comprise wireless communication devices, such as wireless handsets, so-called cellular or satellite radiotelephones, or any wireless devices that can communicate video information over a communication channel 15, in which case communication channel 15 is wireless. The techniques of this disclosure, however, which concern coding video data that include both texture and depth information, are not necessarily limited to wireless applications or settings. The techniques may also be useful in a wide range of other settings and devices, including devices that communicate via physical wires, optical fibers or other physical or wireless media. For example, encoded video may be stored on a storage device for subsequent retrieval, decoding, and display by destination device 16. In addition, the encoding or decoding techniques may also be applied in a standalone device that does not necessarily communicate with any other device.

In the example of FIG. 1, source device 12 may include a video source 20, depth processing unit 21, video encoder 22, modulator/demodulator (modem) 23, and transmitter 24. Destination device 16 may include a receiver 26, modem 27, video decoder 28, and display device 30. In accordance with this disclosure, video encoder 22 of source device 12 may be configured to apply one or more of the techniques of this disclosure as part of a video encoding process. Similarly, video decoder 28 of destination device 16 may be configured to apply one or more of the techniques of this disclosure as part of a video decoding process.

Video encoder 22 may also apply transform, quantization, and entropy coding processes to further reduce the bit rate associated with communication of residual blocks. Transform techniques may comprise discrete cosine transforms (DCTs) or conceptually similar processes. Alternatively, wavelet transforms, integer transforms, or other types of transforms may be used. In a DCT process, as an example, a set of pixel values may be converted into transform coefficients, which may represent the energy of the pixel values in the frequency domain. Video encoder 22 may also quantize the transform coefficients, which may generally involve a process that reduces the number of bits associated with the corresponding transform coefficient. Entropy coding may include one or more processes that collectively compress data for output to a bitstream, where the compressed data may include, for example, a sequence of coding modes, motion information, coded block patterns, and quantized transform coefficients. Examples of entropy coding include, but are not limited to, context adaptive variable length coding (CAVLC) and context adaptive binary arithmetic coding (CABAC).

A coded video block may be represented by prediction information that can be used to create or identify a predictive block, and a residual block of data that can be applied to the predictive block to recreate the original block. The prediction information may comprise the one or more motion vectors that are used to identify the predictive block of data. Using the motion vectors, video decoder 28 may reconstruct the predictive blocks that were used to code the residual blocks. Thus, given a set of residual blocks and a set of motion vectors (and possibly some additional syntax), video decoder 28 can reconstruct a video frame that was originally encoded. Inter-coding based on motion estimation and motion compensation can achieve relatively high amounts of compression without excessive data loss, because successive video frames or other types of coded units are often similar. An encoded video sequence may comprise blocks of residual data, motion vectors (when inter-prediction encoded), indications of intra-prediction modes for intra-prediction, information regarding depth and texture components, and possibly other data, such as types of syntax elements.

Video encoder 22 may also utilize intra-prediction techniques to encode video blocks relative to neighboring video blocks of a common frame or slice. In this manner, video encoder 22 may spatially predict the blocks. Video encoder 22 may be configured with a variety of intra-prediction modes, which generally correspond to various spatial prediction directions. As with motion estimation, video encoder 22 may be configured to select an intra-prediction mode based on a luminance component of a block, then reuse the intra-prediction mode to encode chrominance components of the block. Moreover, in accordance with the techniques of this disclosure, video encoder 22 may reuse the prediction relationship used in encoding a texture component, which comprises luma and chroma components, of a view to encode a depth component of the view. Additionally, according to the techniques of this disclosure, video encoder 22 may encode a texture component of a view relative to texture components of other views, and may encode a depth component of a view relative to depth components of other views. In some examples, video encoder 22 may encode the depth component relative to texture data of a synthesized view.

The techniques of this disclosure may simplify the process of coding texture and depth components in MVD, and may improve bitstream efficiency by encapsulating texture and depth components associated with one view in the same bitstream. These techniques may also include providing information for intra-view prediction, inter-view prediction, and view synthesis prediction. In intra-view prediction, information regarding motion prediction from texture to depth may be signaled. In inter-view prediction, information regarding prediction from one view to the other may be signaled. View synthesis prediction may allow synthesis of a virtual view from a reference view that includes texture and depth components.

The illustrated system 10 of FIG. 1 is merely one example. The various techniques of this disclosure may be performed by any encoding device that supports predictive encoding, or by any decoding device that supports predictive decoding. Source device 12 and destination device 16 are merely examples of such coding devices in which source device 12 generates coded video data for transmission to destination device 16. In some cases, devices 12 and 16 may operate in a substantially symmetrical manner, such that each of devices 12 and 16 include video encoding and decoding components. Hence, system 10 may support one-way or two-way video transmission between video devices 12 and 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and/or computer-generated video. In some cases, if video source 20 is a video camera, source device 12 and destination device 16 may form so-called camera phones or video phones, or other mobile devices configured to manipulate video data, such as tablet computing devices. In each case, the captured, pre-captured, or computer-generated video may be encoded by video encoder 22. Video source 20 captures a view 2 and provides it to depth processing unit 21.

Video source 20 provides view 2 to depth processing unit 21 for calculation of depth image for objects in view 2. Depth processing unit 21 may be configured to automatically calculate depth values for objects in the image of view 2. For example, depth processing unit 21 may calculate depth values for objects based on texture information, which may include luminance and chrominance information. In some examples, depth processing unit 21 may be configured to receive depth information from a user. In some examples, video source 20 may capture two or more views of a scene at different perspectives, and then calculate depth information for objects in the scene based on disparity between the objects in the two or more views. In various examples, video source 20 may comprise a standard two-dimensional camera, a two or more camera system that provides a stereoscopic view of a scene, a camera array that captures multiple views of the scene, or a camera that captures one view plus depth information.

Depth processing unit 21 may pass texture components 4 and depth information 6 to video encoder 22. Depth processing unit 21 may also pass view 2 to video encoder 22. Depth information 6 may comprise a depth map image for view 2. A depth map may comprise a map of depth values for each region of pixels associated with an area (e.g., block, slice, or frame) to be displayed. A region of pixels may be a single pixel or a group of one or more pixels. Some examples of depth maps have one depth component per pixel. In other examples, there may be multiple depth components per pixel.

In some examples, the depth map is estimated. When more than one view is present, stereo matching may be used to estimate depth maps when more than one view is available. However, in 2D to 3D conversion, estimating depth may be more difficult. Nevertheless, depth map estimated by various methods may be used for 3D rendering based on Depth-Image-Based Rendering (DIBR).

Although video source 20 may provide multiple views of a scene, depth processing unit 21 may calculate depth information based on the multiple views and source device 12 may generally transmit one view plus depth information for each view of a scene. In one example of this disclosure, parameters associated with the different views, e.g., camera parameters may be transmitted and used subsequently by the decoder to synthesize a virtual view using a reference view and a corresponding depth map. The camera parameters may include, for example, intrinsic parameters (e.g., the focal length and principle point offset in the horizontal direction) and extrinsic parameters (e.g., a real-world horizontal camera location for each view). Typically, each view of a multi-view sequence will share the same intrinsic parameters. Therefore, these parameters may be signaled once for the sequence, such that the signaled intrinsic parameters apply to all views of the sequence. In this manner, for each sequence, certain camera parameters may be signaled and communicated once, thus reducing the amount of information encoded and transmitted. In one example, the camera parameters may be signaled at the sequence level.

In one example, each depth map image may be represented using 8-bit pixels. For each 8-bit pixel of the depth map image, a real-world z value mapping to the quantized 8-bit depth value may be used, e.g., for DIBR, which may be part of the decoding loop. In the sequence level or picture level, the function that maps from the 8-bit depth value to the real-world z value maybe signaled or assumed. In this example, default depth to z value conversion functions maybe signaled, for example, an indication to specify that the function is an inverse proportional function from depth value to z value. Furthermore, when a function is decided, the depth range may be also signaled, e.g., in sequence parameters set. In examples where more complex conversion between depth value and z-value is utilized, a table containing depth value to real-world z value (256 float numbers) may be signaled.

When view 2 is a digital still picture, video encoder 22 may be configured to encode view 2 as, for example, a Joint Photographic Experts Group (JPEG) image. When view 2 is a frame of video data, video encoder 22 may be configured to encode first view 50 according to a video coding standard such as, for example Motion Picture Experts Group (MPEG), International Organization for Standardization (ISO)/International Electrotechnical Commission (IEC) MPEG-1 Visual, ISO/IEC MPEG-2 Visual, ISO/IEC MPEG-4 Visual, International Telecommunication Union (ITU) H.261, ITU-T H.262, ITU-T H.263, ITU-T H.264/MPEG-4, H.264 Advanced Video Coding (AVC), the upcoming High Efficiency Video Coding (HEVC) standard (also referred to as H.265), or other video encoding standards. Video encoder 22 may encode, for each view, texture data and depth data (e.g., texture slices and depth slices). Video encoder 22 may form network abstraction layer (NAL) units for the texture slices and depth slices and encapsulate the NAL units of a particular view at a particular temporal instance as a view component. In this manner, coded bitstream 8 may include encoded image data or texture information 4, along with depth information 6. Video encoder 22 passes coded bitstream 8 to transmitter 24. Coded bitstream 8 may include coded texture information 4, depth information 6, and may be transmitted along with signaled information such as, for example, prediction dependencies and camera parameters.

Coded bitstream 8 may include texture information 4 and depth information 6. Texture components 4 may include luminance (luma) and chrominance (chroma) components of video information. Luma components generally describe brightness, while chrominance components generally describe hues of color. Depth processing unit 21 may extract depth information 6 from a depth map of video 2. Video encoder 22 may encode texture components 4 and depth information 6 and encapsulate them into a single bitstream, in particular, coded bitstream 8. Likewise, video encoder 22 may encode the bitstream such that motion prediction dependencies for the texture component is used to encode the depth component. In this manner, the depth component may be predicted from the texture component. Additionally, according to the techniques of this disclosure, video encoder 22 may signal camera parameters associated with a particular view, such as focal length and principle point offset in the horizontal direction, and a real-world horizontal camera location for each view.

In this manner, destination device 16 may synthesize views using texture and depth information for a particular view, e.g., to achieve a synthesized view at a particular viewpoint to achieve a particular 3D rendering effect (e.g., to create relatively more or less depth. For example, to create relatively more perceived depth, destination device 16 may synthesize a view having a camera position that is relatively further from the camera position of the coded view, whereas to create relatively less perceived depth, destination device 16 may synthesize a view having a camera position that is relatively closer to the camera position of the coded view. In this manner, destination device 16 may be configured to use camera parameters, such as real-world camera locations for coded views of the bitstream, to synthesize a view used to produce a three-dimensional effect when the view of the bitstream is displayed along with the synthesized view.

Coded bitstream 8 may be modulated by modem 23 according to a communication standard, e.g., such as code division multiple access (CDMA) or another communication standard, and transmitted to destination device 16 via transmitter 24 and communication channel 15. Modem 23 may include various mixers, filters, amplifiers or other components designed for signal modulation. Transmitter 24 may include circuits designed for transmitting data, including amplifiers, filters, and one or more antennas. In some examples, rather than transmitting over a communication channel, source device 12 stores encoded video data (e.g., coded bitstream 8) onto a storage medium, such as a digital video disc (DVD), Blu-ray disc, flash drive, or the like.

Receiver 26 of destination device 16 receives information over communication channel 15, and modem 27 demodulates the information. Like transmitter 24, receiver 26 may include circuits designed for receiving data, including amplifiers, filters, and one or more antennas. In some instances, transmitter 24 and/or receiver 26 may be incorporated within a single transceiver component that includes both receive and transmit circuitry. Modem 27 may include various mixers, filters, amplifiers or other components designed for signal demodulation. In some instances, modems 23 and 27 may include components for performing both modulation and demodulation.

The term "coder" is used herein to refer to a specialized computer device or apparatus that performs video encoding or video decoding. The term "coder" generally refers to any video encoder, video decoder, or combined encoder/decoder (codec). The term "coding" refers to encoding or decoding. The term "coded video data" may refer to any independently decodable unit of a video data such as a block, an entire frame, a slice of a frame, a block of video data, or another independently decodable unit defined according to the coding techniques used.

Display device 30 displays the decoded video data to a user, and may comprise any of a variety of one or more display devices such as a cathode ray tube (CRT), a liquid crystal display (LCD), a plasma display, an organic light emitting diode (OLED) display, or another type of display device. In some examples, display device 30 corresponds to a device capable of three-dimensional playback. For example, display device 30 may comprise a stereoscopic display, which is used in conjunction with eyewear worn by a viewer. The eyewear may comprise active glasses, in which case display device 30 rapidly alternates between images of different views synchronously with alternate shuttering of lenses of the active glasses. Alternatively, the eyewear may comprise passive glasses, in which case display device 30 displays images from different views simultaneously, and the passive glasses may include polarized lenses that are generally polarized in orthogonal directions to filter between the different views.

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16.

Video encoder 22 and video decoder 28 may operate according to a video compression standard, such as the ITU-T H.264 standard, alternatively described as MPEG-4, Part 10, Advanced Video Coding (AVC). Additional video compression standards that are based on the ITU H.264/AVC standard that may be used by video encoder 22 and video decoder 28 include the scalable video coding (SVC) standard, which is a scalable extension to the ITU H.264/AVC standard. Another standard with video encoder 22 and video decoder 28 may operate according to includes the multi-view video coding (MVC) standard, which is a multi-view extension to the ITU H.264/AVC standard. The techniques of this disclosure, however, are not limited to any particular video coding standard.

In some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. When any or all of the techniques of this disclosure are implemented in software, an implementing device may further include hardware for storing and/or executing instructions for the software, e.g., a memory for storing the instructions and one or more processing units for executing the instructions. Each of video encoder 22 and video decoder 28 may be included in one or more encoders or decoders, either of which may be integrated as part of a combined codec that provides encoding and decoding capabilities in a respective mobile device, subscriber device, broadcast device, server, or the like.

A video sequence typically includes a series of video frames, also referred to as video pictures. Video encoder 22 operates on video blocks within individual video frames in order to encode the video data. The video blocks may have fixed or varying sizes, and may differ in size according to a specified coding standard. Each video frame includes a series of one or more slices. In the ITU-T H.264 standard, for example, each slice may include a series of macroblocks, which may be arranged into sub-blocks. The H.264 standard supports intra prediction in various block sizes for two dimensional (2D) video encoding, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform (DCT) or a conceptually similar transformation process. These techniques may be extended to 3D video streams that include two components, texture and depth.

Smaller video blocks can provide better resolution, and may be used for locations of a video frame that include high levels of detail. In general, macroblocks and the various sub-blocks may be considered to be video blocks. In addition, a slice of video data may be considered to be a series of video blocks, such as macroblocks and/or sub-blocks. Each slice may be an independently decodable unit of a video frame. Alternatively, frames themselves may be decodable units, or other portions of a frame may be defined as decodable units.

The 2D video data units (e.g., frames or slices) of the ITU-T H.264 standard may be extended to 3D by encoding depth information 6 from a depth map or parallax map in addition to texture components 4 for that video frame or slice. Parallax mapping (also referred to as virtual displacement mapping or offset mapping) displaces texture components at a pixel location based on a function of a view angle and a height map at the pixel location. Video encoder 22 may encode the depth information as monochromatic video. This monochromatic video encoded depth information for a view may be encoded and encapsulated in a video unit (e.g., bitstream) along with the texture component of the same view. In accordance with techniques of this disclosure, a view component of a view of video data may include both texture and depth components coded and encapsulated together in the same bitstream. The view component is a unit of data that includes all data for a common temporal instance for a particular view (e.g., a particular camera or video-capturing element).

To encode video blocks, such as video blocks that make up the components of the coded bitstream 8, video encoder 22 performs intra- or inter-prediction to generate one or more prediction blocks. Video encoder 22 may generate prediction blocks for the texture component data unit (e.g., frame or slice) and the depth component data unit. Additionally, video encoder 22 may perform intra- or inter-view prediction to generate one or more prediction blocks for a view, where intra-view prediction may exploit the dependency between components within the same view and inter-view prediction may exploit the dependency among components of different views.

Video encoder 22 subtracts the prediction blocks from the original video blocks to be encoded to generate residual blocks. Thus, the residual blocks may represent pixel-by-pixel differences between the blocks being coded and the prediction blocks. Video encoder 22 may perform a transform on the residual blocks to generate blocks of transform coefficients. Following intra- or inter-based predictive coding and transformation techniques, video encoder 22 may quantize the transform coefficients. Quantization generally refers to a process in which coefficients are quantized to possibly reduce the amount of data used to represent the coefficients. Following quantization, entropy coding may be performed according to an entropy coding methodology, such as context adaptive variable length coding (CAVLC) or context adaptive binary arithmetic coding (CABAC). Additional details of an encoding process performed by video encoder 22 are described below with respect to FIG. 2.

Efforts are currently in progress to develop a new video coding standard, currently referred to as High Efficiency Video Coding (HEVC). The upcoming standard is also referred to as H.265. The standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-four intra-prediction encoding modes. HEVC may be extended to support the two component video units as described herein.

HM refers to a block of video data as a coding unit (CU). Syntax data within a bitstream may define a largest coding unit (LCU), which is a largest coding unit in terms of the number of pixels. In general, a CU has a similar purpose to a macroblock of H.264, except that a CU does not have a size distinction. The two-component (i.e., texture and depth components) coded block may be a CU according to the HM standard. Thus, a CU may be split into sub-CUs. In general, references in this disclosure to a CU may refer to a largest coding unit (LCU) of a picture or a sub-CU of an LCU. An LCU may be split into sub-CUs, and each sub-CU may be split into sub-CUs. Syntax data for a bitstream may define a maximum number of times an LCU may be split, referred to as CU depth. Accordingly, a bitstream may also define a smallest coding unit (SCU). This disclosure also uses the term "block" to refer to any of a CU, prediction unit (PU), or transform unit (TU).

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. As another example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. The motion vector may also be treated as having different resolutions for texture components 4 and depth information 6. Data for the CU defining the PU(s) may also describe, for example, partitioning of the CU into one or more PUs. Partitioning modes may differ between whether the CU is uncoded, intra-prediction mode encoded, or inter-prediction mode encoded.

A CU having one or more PUs may also include one or more transform units (TUs). Following prediction using a PU, video encoder 22 may calculate a residual value for the portion of the CU corresponding to the PU. The residual value may be transformed, scanned, and quantized. A TU is not necessarily limited to the size of a PU. Thus, TUs may be larger or smaller than corresponding PUs for the same CU. In some examples, the maximum size of a TU may correspond to the size of the corresponding CU.

As noted above, intra-prediction includes predicting a PU of a current CU of a picture from previously coded CUs of the same picture. More specifically, video encoder 22 may intra-predict a current CU of a picture using a particular intra-prediction mode. An HM encoder may be configured with up to thirty-four intra-prediction modes. Therefore, to support a one-to-one mapping between directional intra-prediction modes and directional transforms, HM encoders and decoders would need to store 66 matrices for each supported transform size. Furthermore, the block sizes for which all thirty-four intra-prediction modes are supported may be relatively large blocks, e.g., 32×32 pixels, 64×64 pixels, or even larger.

After encoding each of the texture and depth components, video encoder 22 may determine any prediction dependencies between the texture and depth components of a view and/or among the texture and depth components of different views. Source device 12 may implement the techniques of this disclosure by encapsulating texture and depth components into respective VCL NAL units corresponding to the same temporal instance for a view, which may be treated as a common view component. Techniques of this disclosure may provide for coding texture data and depth map data for a view consecutively in the bitstream (e.g., coded bitstream 8). To separate the texture and depth map information of a view component, video encoder 22 may add a delimiter in the bitstream, e.g., a NAL unit delimiter that indicates the end of the texture information and the beginning of the depth information for the view component. Additionally, video encoder 22 may signal within the bitstream intra- and inter-view prediction dependencies and parameters associated with view synthesis prediction.

In accordance with another aspect of this disclosure, video encoder 22 may signal camera parameters in the video data and may further describe depth value to real-world z value mapping. The video data may also describe a prediction relationship of depth map views and texture views. Video encoder 22 may signal these additional parameters and information at the sequence level (e.g., in a sequence parameter set (SPS) data structure), the picture level (e.g., in a picture parameter set (PPS) data structure or frame header), the slice level (e.g., in a slice header), or the block level (e.g., in a block header).

In destination device 16, video decoder 28 receives the encoded video data (e.g., coded bitstream 8). Video decoder 28 may differentiate texture NAL units (e.g., the texture component) from depth NAL units (e.g., the depth component) using a flag indicating whether an NAL unit includes texture or depth information, as discussed below. After decoding the depth components, destination device 16 may use one 2D view (i.e., texture information) and discard other views and depth information; use one 2D view and its corresponding depth information to synthesize a virtual view for 3D playback; use two or more 2D views for 3D playback; or use multiple views and their depth information to produce multiple virtual views for multiview playback. Determining how to play back the content may depend on factors such as, for example, the type of device display device 30 is and the video formats supported by display device 30.

After separating the texture and depth components of coded bitstream 8, video decoder 28 entropy decodes the received video data, such as coded blocks corresponding to each of the components according to an entropy coding methodology, such as CAVLC or CABAC, to obtain the quantized coefficients. Video decoder 28 applies inverse quantization (de-quantization) and inverse transform functions to reconstruct the residual block in the pixel domain. Video decoder 28 also generates a prediction block based on control information or syntax information (e.g., coding mode, motion vectors, syntax that defines filter coefficients and the like) included in the encoded video data. Video decoder 28 may calculate a sum of the prediction block and the reconstructed residual block to produce a reconstructed video block for display. Additional details of an example decoding process performed by video decoder 28 are described below with respect to FIG. 7.

As described herein, texture information may comprise three components, for example, Y may represent luminance, Cb and Cr may represent two different values of chrominance of a three-dimensional YCbCr color space (e.g., blue and red hues), and D may represent depth information. In some examples, each pixel location may actually define one pixel value for the texture of the pixel and one pixel value for the depth of the pixel location. The texture value may comprise, for example, two or more values representing luminance and chrominance components. Additionally, the depth and texture components may have different resolutions. Both the depth component and the texture component may be partitioned into respective blocks of pixels, each of which may be individually coded.

In some examples, video encoder 22 and video decoder 28 may use one or more interpolation filtering techniques during motion compensation. That is, video encoder 22 and/or video decoder 28 may apply an interpolation filter to filter support comprising sets of full integer pixel positions.

As noted above, video decoder 28 of destination device 16 may receive the coded bitstream 8, which may include texture and depth components, along with additional information, including prediction dependencies and information regarding the view associated with the texture and depth components. Additionally, camera parameters may be signaled for the view. Video decoder 28 may render video data for 3D playback based on the components of coded bitstream 8 and one or more additional information including view information and camera parameters. In accordance with the techniques of this disclosure, and as discussed in greater detail below, the included information for one or more views may be utilized to predict the texture component of one view from texture components of one or more other views, and the depth component of one view based on the texture component of the same view and/or depth components of one or more other views.

Figure 2:
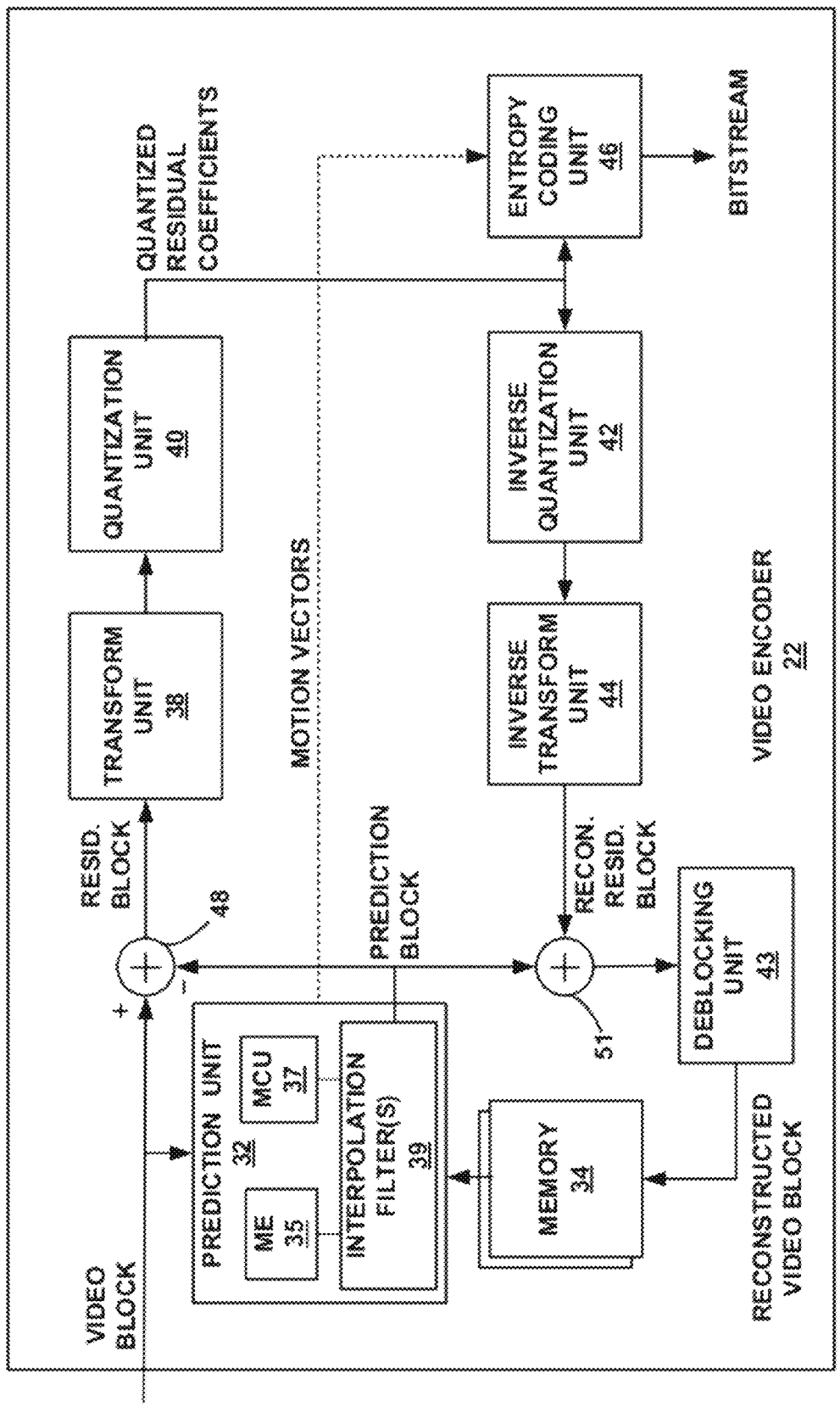
FIG. 2 is a block diagram illustrating an example of the video encoder of FIG. 1 in further detail.

FIG. 2 is a block diagram illustrating an example of the video encoder 22 of FIG. 1 in further detail. Video encoder 22 may encode block units associated with images corresponding to different views provided by a video source, where each view may comprise a texture component and a depth component. Video encoder 22 is one example of a specialized video computer device or apparatus referred to herein as a "coder." As shown in FIG. 2, video encoder 22 corresponds to video encoder 22 of source device 12. However, in other examples, video encoder 22 may correspond to a different device. In further examples, other units (such as, for example, other encoder/decoder (CODECS)) can also perform similar techniques to those performed by video encoder 22.

Video encoder 22 may perform intra- and inter-coding of blocks within video frames, although intra-coding components are not shown in FIG. 2 for ease of illustration. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to the spatial-based compression mode. Inter-modes such as a prediction (P-mode) or a bi-directional (B-mode) may refer to the temporal based compression modes. However, for simplicity and ease of illustration, intra-coding units such as a spatial prediction unit are not illustrated in FIG. 2.

As shown in FIG. 2, video encoder 22 receives video blocks associated with texture and depth components of a video frame to be encoded, where the video frame may correspond to one of multiple views at a specific time. For example, video encoder 22 may receive texture components 4 and depth components 6. In the example of FIG. 2, video encoder 22 includes a prediction coding unit (MCU) 32, memory 34, an adder 48, a transform unit 38, a quantization unit 40, and an entropy coding unit 46. For video block reconstruction, video encoder 22 also includes an inverse quantization unit 42, an inverse transform unit 44, an adder 51, and a deblocking unit 43. Deblocking unit 43 may be a deblocking filter that may filter block boundaries to remove blockiness artifacts from reconstructed video. If included in video encoder 22, deblocking unit 43 would typically filter the output of adder 51. In one example, as shown in FIG. 2, transform unit 38 may be a functional block, not a "TU" in terms of HEVC. Deblocking unit 43 may determine deblocking information for the one or more texture components. Deblocking unit 43 may also determine deblocking information for the depth map component. In some examples, the deblocking information for the one or more texture components may be different than the deblocking information for the depth map component.

In some examples, video encoder 22 may include a view synthesis unit for synthesizing virtual views used for reference when encoding data of other views. The view synthesis unit is not shown in the illustration of FIG. 2 for clarity, but when provided, would ordinarily retrieve data from memory 34 (such as texture and depth information for a particular view component), synthesize a view component including texture information using the retrieved data, and store the synthesized view component to memory 34 for use as reference when coding video data of other views.

Prediction unit 32 receives the video block (labeled "VIDEO BLOCK" in FIG. 2) comprising texture components 4 or depth information 6. Prediction unit 32 may include a motion estimation (ME) unit 35 and a motion compensation (MC) unit 37. Prediction unit 32 may predict depth information in the depth component blocks and texture information in the texture component blocks. One or more interpolation filters 39 (referred to herein as "filter 39") may be included in prediction unit 32 and may be invoked by one or both of ME unit 35 and MC unit 37 to perform interpolation as part of motion estimation and/or motion compensation. Interpolation filter 39 may actually represent a plurality of different filters to facilitate numerous different types of interpolation and interpolation-type filtering. Thus, prediction unit 32 may include a plurality of interpolation or interpolation-like filters. Prediction unit 32 may predict depth and/or texture information using depth and/or texture information from the same view and/or other views associated with a common temporal instance. Prediction unit 32 may also perform view synthesis prediction, which may provide prediction information that allows prediction of a block of a view relative to data of a synthesized view.

During the encoding process, video encoder 22 receives a video block to be coded (labeled "VIDEO BLOCK" in FIG. 2), and prediction unit 32 performs inter-prediction coding to generate a prediction block (labeled "PREDICTION BLOCK" in FIG. 2). The video block to be coded and the prediction block may each correspond texture components 4 and depth information 6. Specifically, ME unit 35 may perform motion estimation to identify the prediction block in memory 34, and MC unit 37 may perform motion compensation to generate the prediction block. ME unit 35 and MC unit 37 may perform motion estimation and motion compensation, respectively, using blocks corresponding to texture and/or depth components from the same view or other views associated with a common temporal instance. ME unit 35 may in fact produce a "displacement vector" when performing inter-view prediction, which is conceptually similar to a motion vector, but generally predicts horizontal offset of a particular block due to differences in horizontal positions of the cameras for the respective views, rather than motion of objects over time. MC unit 37 may therefore also be referred to as a "motion/displacement compensation unit." In this manner, ME unit 35 and MC unit 37 may make determinations that can be used in inter- and intra-view prediction of texture and depth components.

Motion estimation is typically considered the process of generating motion vectors, which estimate motion for video blocks. A motion vector, for example, may indicate the displacement of a prediction block within a prediction or reference frame (or other coded unit, e.g., slice) relative to the block to be coded within the current frame (or other coded unit). The motion vector may have full-integer or sub-integer pixel precision. For example, both a horizontal component and a vertical component of the motion vector may have respective full integer components and sub-integer components. The reference frame (or portion of the frame) may be temporally located prior to or after the video frame (or portion of the video frame) to which the current video block belongs. Motion compensation is typically considered the process of fetching or generating the prediction block from memory 34, which may include interpolating or otherwise generating the predictive data based on the motion vector determined by motion estimation.

ME unit 35 calculates at least one motion vector for the video block to be coded by comparing the video block to reference blocks of one or more reference frames (e.g., a previous and/or subsequent frame or frames from other views at the same temporal instance). Data for the reference frames (e.g., texture and/or depth components) may be stored in memory 34. ME unit 35 may perform motion estimation with fractional pixel precision, sometimes referred to as fractional pixel, fractional pel, sub-integer, or sub-pixel motion estimation. In fractional pixel motion estimation, ME unit 35 may calculate a motion vector that indicates displacement to a location other than an integer pixel location. Thus, the motion vector may have fractional pixel precision, e.g., one-half-pixel precision, one-quarter-pixel precision, one-eighth pixel precision, or other fractional pixel precisions. In this manner, fractional pixel motion estimation allows prediction unit 32 to estimate motion with higher precision than integer-pixel (or full-pixel) locations, and thus, prediction unit 32 may generate a more accurate prediction block.

ME unit 35 may invoke filter(s) 39 for any necessary interpolations during the motion estimation process. In some examples, memory 34 may store interpolated values for sub-integer pixels, which may be calculated by, e.g., summer 51 using filter(s) 39. For example, summer 51 may apply filter(s) 39 to reconstructed blocks that are to be stored in memory 34.

To perform fractional pixel motion compensation, MC unit 37 may perform interpolation (sometimes referred to as interpolation filtering) in order to generate data at sub-pixel resolution (referred to herein as sub-pixel or fractional pixel values). MC unit 37 may invoke filter(s) 39 for this interpolation. In this manner, prediction unit 32 may calculate values for sub-integer pixel positions of a reference block, which may then be used to produce a predictive block of video data for each of the depth and texture components of the 3D block unit. In one example, a predictive block may be produced for the texture component of the 3D block unit, and the predictive block or the texture component of the 3D block unit may be utilized to produce the depth component of the same 3D block unit, corresponding to the same view, or other views associated with a common temporal instance.

Once the motion vector for the video block to be coded is calculated by ME unit 35, MC unit 37 generates the prediction video block associated with that motion vector. MC unit 37 may fetch the prediction block from memory 34 based on the motion vector determined by MC unit 35. In the case of a motion vector with fractional pixel precision, MC unit 37 may filter data from memory 34 to interpolate such data to sub-pixel resolution, e.g., invoking filter(s) 39 for this process.

In some cases, the full-integer pixel positions corresponding to the filter coefficients used to interpolate such data to sub-pixel resolution may be indicated as one or more interpolation syntax elements to entropy coding unit 46 for inclusion in the coded bitstream. Similarly, the interpolation filtering technique or mode that was used to generate the sub-pixel prediction data may also be indicated as one or more interpolation syntax elements to entropy coding unit 46 for inclusion in the coded bitstream.

Once prediction unit 32 has generated the prediction block, video encoder 22 forms a residual video block (labeled "RESID. BLOCK" in FIG. 2) by subtracting the prediction block from the original video block being coded. This subtraction may occur between texture components in the original video block and texture components in the texture prediction block, as well as for depth information in the original video block or depth map from depth information in the depth prediction block. Adder 48 represents the component or components that perform this subtraction operation.

Transform unit 38 applies a transform, such as a discrete cosine transform (DCT) or a conceptually similar transform, to the residual block, producing a video block comprising residual transform block coefficients. It should be understood that transform unit 38 represents the component of video encoder 22 that applies a transform to residual coefficients of a block of video data, in contrast to a TU of a CU as defined by HEVC. Transform unit 38, for example, may perform other transforms, such as those defined by the H.264 standard, which are conceptually similar to DCT. Such transforms may include, for example, directional transforms (such as Karhunen-Loeve theorem transforms), wavelet transforms, integer transforms, sub-band transforms, or other types of transforms. In any case, transform unit 38 applies the transform to the residual block, producing a block of residual transform coefficients. Transform unit 38 may apply the same type of transform to both the texture components and the depth information in corresponding residual blocks. There will be separate residual blocks for each texture and depth component. The transform may convert the residual information from a pixel domain to a frequency domain.

Quantization unit 40 quantizes the residual transform coefficients to further reduce bit rate. The quantization process may reduce the bit depth associated with some or all of the coefficients. Quantization unit 40 may quantize a depth image coding residue. Following quantization, entropy coding unit 46 entropy codes the quantized transform coefficients. For example, entropy coding unit 46 may perform CAVLC, CABAC, or another entropy coding methodology.

Entropy coding unit 46 may also code one or more motion vectors and support information obtained from prediction unit 32 or other component of video encoder 22, such as quantization unit 40. The one or more prediction syntax elements may include a coding mode, data for one or more motion vectors (e.g., horizontal and vertical components, reference list identifiers, list indexes, and/or motion vector resolution signaling information), an indication of a used interpolation technique, a set of filter coefficients, an indication of the relative resolution of the depth image to the resolution of the luma component, a quantization matrix for the depth image coding residue, deblocking information for the depth image, or other information associated with the generation of the prediction block. These prediction syntax elements may be provided in the sequence level or in the picture level. In accordance with techniques of this disclosure, entropy coding unit 46 may also code information regarding intra- and inter-view prediction dependencies and parameters associated with view synthesis prediction.

The one or more syntax elements may also include a quantization parameter (QP) difference between the texture component and the depth component. The QP difference may be signaled at the slice level. Other syntax elements may also be signaled at a coded block unit level, including a coded block pattern for the depth information, a delta QP for the depth information, a motion vector difference, or other information associated with the generation of the prediction block. The motion vector difference may be signaled as a delta value between a target motion vector and a motion vector of the texture components, or as a delta value between the target motion vector (that is, the motion vector of the block being coded) and a predictor from neighboring motion vectors for the block (e.g., a PU of a CU).

In accordance with the techniques of this disclosure, following entropy coding by entropy coding unit 46, the texture component and the depth component of a view may be encapsulated into VCL NAL units corresponding to the same temporal instance for the view. Entropy coding unit 46 may add a NAL unit header to respective slices and frames of texture or depth information to encapsulate depth or texture information within a respective NAL unit. Video encoder 22 may also add a NAL unit delimiter in the bitstream that indicates the end of the texture data and the beginning of the depth information for the view. Alternatively, video encoder 22 may set a value for a depth flag included in the NAL unit header to indicate whether the NAL unit includes texture or depth information.

Additionally, techniques of this disclosure may provide a signal within the bitstream regarding the intra- and inter-view prediction dependencies and parameters associated with view synthesis prediction. That is, video encoder 22 may provide information indicative of particular elements used for reference for texture components and depth components. The coded bitstream encapsulating the texture and depth components of a view may then be transmitted to another device or archived (for example, in memory 34) for later transmission or retrieval.

Inverse quantization unit 42 and inverse transform unit 44 apply inverse quantization and inverse transformation, respectively, to reconstruct the residual block in the pixel domain, e.g., for later use as a reference block. The reconstructed residual block (labeled "RECON. RESID. BLOCK" in FIG. 2) may represent a reconstructed version of the residual block provided to transform unit 38. The reconstructed residual block may differ from the residual block generated by summer 48 due to loss of detail caused by the quantization and inverse quantization operations. Summer 51 adds the reconstructed residual block to the motion compensated prediction block produced by prediction unit 32 to produce a reconstructed video block for storage in memory 34. The reconstructed video block may be used by prediction unit 32 as a reference block that may be used to subsequently code a block unit in a subsequent video frame or subsequent coded unit.

In this manner, video encoder 22 represents an example of a video encoder configured to receive texture data for a temporal instance of a view of video data, receive depth data corresponding to the texture data for the temporal instance of the view of video data, and encapsulate the texture data and the depth data in a view component for the temporal instance of the view, such that the texture data and the depth data are encapsulated within a common bitstream. Video encoder 22 may also signal information regarding prediction dependencies such as, for example, intra-prediction (e.g., predicting depth information from other depth information of the same view), temporal or inter-view prediction (e.g., predicting depth information from depth information of a different view component or from texture information of a different view component), and camera parameters for a camera used to capture the texture data of the view of video data.

FIGS. 3A-3B are conceptual diagrams illustrating examples of elements of a bitstream structure that may be used in an implementation of one or more of the techniques of this disclosure. A bitstream may be used to transfer two-component MVD block units and syntax elements between, for example, source device 12 and destination device 16 of FIG. 1. The bitstream may comply with the coding standard ITU H.264/AVC, and in particular, follows an MVC bitstream structure. That is, the bitstream may conform to the MVC extension of H.264/AVC, in some examples. In other examples, the bitstream may conform to a multiview extension of HEVC or multiview extension of another standard. In still other examples, other coding standards may be used.

A typical MVC bitstream order (decoding order) arrangement is a time-first coding. Each access unit is defined to contain the coded pictures of all the views for one output time instance. The decoding order of access units may or may not be identical to the output or display order. Typically, MVC prediction may include both inter-picture prediction within each view and inter-view prediction. In MVC, the inter-view prediction may be supported by disparity motion compensation, which uses the syntax of the H.264/AVC motion compensation, but allows a picture in a different view to be used as a reference picture.

Coding of two views is supported by MVC. One of the advantages of MVC is that an MVC encoder could take more than two views as a 3D video input and an MVC decoder can decode the two views into a multi-view representation. Thus, a renderer with MVC decoder may treat 3D video content as having multiple views. Previously, MVC did not process depth map input, similar to H.264/AVC with SEI messages (stereo info. or spatial interleaving pictures).

In the H.264/AVC standard, Network Abstraction Layer (NAL) units which are defined to provide a "network-friendly" video representation addressing applications such as video telephony, storage, or streaming video. NAL units can be categorized to Video Coding Layer (VCL) NAL units and non-VCL NAL units. VCL units may contain a core compression engine and comprise block, macroblock (MB), and slice levels. Other NAL units are non-VCL NAL units.

For 2D video encoding, each NAL unit may contain a one byte NAL unit header and a payload of varying size. Five bits may be used to specify the NAL unit type. Three bits may be used for nal_ref_idc, which indicates how important the NAL unit is in terms of being referenced by other pictures (NAL units). For example, setting nal_ref_idc equal to 0 means that the NAL unit is not used for inter prediction. As H.264/AVC may be expanded to include 3D video encoding, such as the scalable video coding (SVC) standard, the NAL header may be similar to that of the 2D scenario. For example, one or more bits in the NAL unit header may be used to identify that the NAL unit is a four-component NAL unit.

NAL unit headers may also be used for MVC NAL units. However, in MVC, the NAL unit header structure may be retained except for prefix NAL units and MVC coded slice NAL units. MVC coded slice NAL units may comprise a four-byte header and the NAL unit payload, which may include a block unit such as coded block 8 of FIG. 1. Syntax elements in MVC NAL unit header may include priority_id, temporal_id, anchor_pic_flag, view_id, non_idr_flag and inter_view_flag. In other examples, other syntax elements may be included in an MVC NAL unit header.

The syntax element anchor_pic_flag may indicate whether a picture is an anchor picture or non-anchor picture. Anchor pictures and all the pictures succeeding it in the output order (i.e., display order) can be correctly decoded without decoding of previous pictures in the decoding order (i.e., bitstream order) and thus can be used as random access points. Anchor pictures and non-anchor pictures can have different dependencies, both of which may be signaled in the sequence parameter set.

The bitstream structure defined in MVC may be characterized by two syntax elements: view_id and temporal_id. The syntax element view_id may indicate the identifier of each view. This identifier in NAL unit header enables easy identification of NAL units at the decoder and quick access of the decoded views for display. The syntax element temporal_id may indicate the temporal scalability hierarchy or, indirectly, the frame rate. For example, an operation point including NAL units with a smaller maximum temporal_id value may have a lower frame rate than an operation point with a larger maximum temporal_id value. Coded pictures with a higher temporal_id value typically depend on the coded pictures with lower temporal_id values within a view, but may not depend on any coded picture with a higher temporal_id.

The syntax elements view_id and temporal_id in the NAL unit header may be used for both bitstream extraction and adaptation. The syntax element priority_id may be mainly used for the simple one-path bitstream adaptation process. The syntax element inter_view_flag may indicate whether this NAL unit will be used for inter-view predicting another NAL unit in a different view.

MVC may also employ sequence parameter sets (SPSs) and include an SPS MVC extension. Parameter sets are used for signaling in H.264/AVC. Parameter sets may contain sequence-level header information in sequence parameter sets and the infrequently changing picture-level header information in picture parameter sets (PPSs). With parameter sets, this infrequently changing information needs not to be repeated for each sequence or picture, hence coding efficiency is improved. Furthermore, the use of parameter sets enables out-of-band transmission of the header information, avoiding the need of redundant transmissions for error resilience. In some examples of out-of-band transmission, parameter set NAL units may be transmitted on a different channel than the other NAL units. In MVC, a view dependency may be signaled in the SPS MVC extension. All inter-view prediction may be done within the scope specified by the SPS MVC extension.

In 3D video encoding techniques, it may desirable to jointly code the texture and depth of the MVD content with a high efficiency. However, to efficiently achieve jointly coding the texture and depth components, it may be desirable to meet certain requirements. For example, it may be preferable to manage the coded pictures and decoded pictures of the depth and the texture globally. Therefore, it may desirable to utilize a distinct NAL unit for the depth map from an NAL unit for the texture inside a view. It may also be desirable for the format to be compatible with certain standards, e.g., H.264/AVC and MVC. Furthermore, there may be correlations between the depth map and texture of the same view and between different views, which may be utilized to improve the coding efficiency.

As described herein, techniques may be added to existing standards, such as MVC, in order to support 3D video. Multi-view video plus depth (MVD) may be added to MVC for 3D video processing. The 3D video encoding techniques may provide more flexibility and extensibility to existing video standards, for example, for changing the view angle smoothly or adjusting the convergence or depth perception backward or forward based on the specifications of the devices or user preferences. The coding standards may also be expanded to utilize depth maps for the generation of virtual views in 3D video.

Techniques of this disclosure may provide the framework for the coding of 3D video. For example, the coded images and decoded images may be optimally managed for texture and depth. The techniques of this disclosure may also provide a structure that is compatible with MVC stereo profile (e.g., where there are two views). The techniques may also provide signaling in the bitstream of prediction dependencies (e.g., between the texture and depth components of one view, or among the texture components of different views) and of parameters beneficial for coding (e.g., camera parameters that for each view). In accordance with techniques of this disclosure, a NAL unit delimiter may be added in the bitstream, between a texture view component and a depth view component. For example, the delimiter may indicate the end of the texture data (e.g., texture view component) and the beginning of the depth information (e.g., depth view component), the end of the depth information, or the beginning of texture data for the view component. Such a delimiter may be used, for example, in MPEG-2 TS or other systems. In one example, the delimiter may have a different NAL unit type from the NAL unit delimiter which is used to separate the view components from different views in MVC.

FIG. 3A is a conceptual diagram illustrating an example of a bitstream structure 70 that may be used in an implementation of one or more of the techniques of this disclosure. In FIG. 3A, bitstream 70 complies with the MVC standard after being extended to include MVD, in accordance with the techniques of this disclosure. In other examples, bitstream 70 may conform to other video encoding standards.

Bitstream 70 may comprise additional information relating to signaling of the block units. For example, bitstream 70 may include an indication of prediction dependencies between different components, such as depth information 6 relative to one or more texture components 4. In other examples, bitstream 70 may include an indication of prediction dependencies between texture components associated with different views. In other examples, bitstream 70 may signal camera parameters for a view associated with the texture and depth components indicated in the bitstream.

As shown in FIG. 3A, bitstream 70 comprises a plurality of access units 72-1 through 72-N. Access units comprise a set of view components (referred to as views for convenience below), such as views 74-1 through 74-M. In general, access units include all data for a common temporal instance, e.g., data for one view component per view. In some examples, each access unit 72-1 through 72-N comprises the same number of views 74-1 through 74-M (referred to as a view 74). Decoding each access unit may result in one decoded picture per view. Access units 72-1 through 72-N may contain encoded video data that may be used to render 3D video playback. In accordance with the techniques of this disclosure, the view components of the access units may include a texture and a depth component.

FIG. 3B is a conceptual diagram illustrating an example of a view component 74-M that may be included in the structure of the bitstream 70 of FIG. 3A. Each view component in an access unit (such as view component 74-1 in access unit 72-1) contains a set of video codec layer (VCL) NAL units 76-1 through 76-3. View component 74-M comprises NAL units 76-1 through 76-3 in a specific form and order. Typically, the view components are arranged in the same order in each access unit, such that the kth view component in each access unit corresponds to the same view. In other examples, view component 74-M comprises other numbers of NAL units, some of which may comprise texture information, while others may comprise depth information. In accordance with the techniques of this disclosure, NAL units 76-1 through 76-3 may include information (e.g., a flag) indicating whether the NAL unit includes texture or depth information. Additionally, a NAL unit delimiter may be utilized to indicate where the texture information NAL unit stops and the depth information NAL unit starts.

In one example, in implementing the NAL unit, an NAL unit header extension may be used, where a flag may be added into the NAL unit header, to indicate whether the current NAL unit contains a VCL NAL unit of a depth map or the texture of a view. Alternatively, a new NAL unit type can be added to indicate whether the NAL unit is a VCL NAL unit corresponding to a depth map slice. One bit might be added in the VCL NAL unit of a depth map, to indicate whether this VCL NAL unit is used to predict any coded picture of the texture of a view. The semantics of inter_view_flag may be extended provide the desired indication, and if not, the inter_view_flag in the VCL NAL unit of a depth map indicates that this NAL unit is used to predict the depth map of another view. In one example, a prefix NAL unit may contain the NAL unit header base view extension, nal_unit_header_mvc_extension( ) defined as follows:

```
nal_unit_header_mvc_extension( ) {
    non_idr_flag
    priority_id
    view_id
    temporal_id
    anchor_pic_flag
    inter_view_flag
    depth_flag
    depth_to_view_flag
}
``` where depth_flag indicates whether or not the associated view component is a depth map NAL unit. The value of depth_flag may be set to 1 to indicate that the NAL unit is a coded VCL NAL unit of the depth map, and set to 0 to indicate that the NAL unit is a coded VCL NAL unit of the texture of a view. When depth_to_view_flag is equal to 0, that may indicate that the current view component is not used to predict depth view components, if it is a texture view component. If it is a depth view component, then it is not used to predict texture components. When depth_to_view_flag is equal to 1, it may indicate that the current view component may be used to predict depth view components of the same access unit, if it is a texture view component, and may be used to predict texture view components of the same access unit, if it is a depth view component. When inter_view_flag is equal to 1, it indicates whether the current view component may be used to a view component, which together with the current view component are both texture view component or are both depth view component.

TABLE 1 below illustrates example NAL unit type codes, syntax element categories, and NAL unit type classes. nal_unit_type 21 may be introduced for the NAL units containing depth view components, namely slice_layer_depth_extension_rbsp( )

TABLE 1

| nal_unit_type | Content of NAL unit and RBSP syntax structure | C | Annex A NAL unit type class | Annex G and Annex H NAL unit type class |
|---|---|---|---|---|
| 0 | Unspecified | | non-VCL | non-VCL |
| 1 | Coded slice of a non-IDR picture slice_layer_without_partitioning_rbsp( ) | 2, 3, 4 | VCL | VCL |
| ... | | | | |
| 19 | Coded slice of an auxiliary coded picture without partitioning slice_layer_without_partitioning_rbsp( ) | 2, 3, 4 | non-VCL | non-VCL |
| 20 | Coded slice extension slice_layer_extension_rbsp( ) | 2, 3, 4 | non-VCL | VCL |
| 21 | Coded slice depth extension slice_layer_depth_extension_rbsp( ) | 2, 3, 4 | non-VCL | VCL |
| 21 ... 23 | Reserved | | non-VCL | non-VCL |
| 24 ... 31 | Unspecified | | non-VCL | non-VCL |

In one example, sequence parameter set depth extension may be utilized and may have the following example general design:

```
seq_parameter_set_depth_extension( ) {
  depth_z_mapping_idc
  if (depth_z_mapping_idc = = 2 )
    for ( i=0; i<256; i++)
      value_z_i( )
  else if (depth_z_mapping_idc < 2) {
    value_z_near( )
    value_z_far( )
  }
  // intrinsic parameters
  value_focal_length_x( )
  value_focal_length_y( )
  value_principal_point_x( )
  value_principal_point_y( )
  // extrinsic parameters
  value_rotation_xy( )
  value_rotation_xz( )
  value_rotaion_yz( )
  horizontal_alligned_flag
  if (! horizontal_alligned_flag )
    for( i = 0; i <= num_views_minus1; i++) {
      value_rotation_xy_i( )
    for (i = 0; i <= num_views_minus1; i++) {
      value_translation( )
    }
  }
``` where depth_z_mapping_idc specifies the depth map quantization method used for converting real-world z value to the 8-bit depth value d. When this value is equal to 0, it specifies that d is proportional to 1/z, that is d/255=(1/z−1/z_far)/(1/z_near−1/z_far). When this value is equal to 1, it specifies that d is proportional to z, that is d/255=(z−z_near)/(z_far−z_near). When this value equal to 2, it specifies that the mapping form d to z is explicitly signalled. value_z_i( ) is the syntax table to signal the z[i] value for each 8-bit depth value equal d to i, when depth_z_mapping_idc is equal to 2. value_z_near( ) and value_z_far( ) are syntax tables to signal the z_near and z_far values respectively. value_focal_length_x( ) and value_focal_length_y( ) are the syntax tables to signal the focol_length_x and focal_length_y values respectively, as part of the intrinsic camera parameter which may be shared by all the cameras. value_principal_point_x( ) and value_principal_point_y( ) are the syntax tables to signal the principal_point_x and principal_point_y values, respectively, as part of the intrinsic camera parameter which may be shared by all the cameras.

The rotation matrix R of the extrinsic camera parameter for a camera may be represented as follows:

$$R = \begin{bmatrix} R_{yz} & 0 & 0 \\ 0 & R_{xz} & 0 \\ 0 & 0 & R_{xy} \end{bmatrix}$$

value_rotation_xy( ), value_rotation_xz( ) and value_rotation_yz( ) are the syntax tables to signal the value of the diagonal elements of the rotation matrix R. horizontal_alligned_flag equal to 1 indicates that all the cameras are horizontally aligned. value_rotation_xy_i( ) is the syntax table to signal the value of the Rxy of the rotation matrix R for camera corresponding to view i. value_translation( ) is the syntax table to signal the value of the translation, as part of the extrinsic camera parameter of the camera corresponding to view i. Typically, value_syntax( ) may be signaled as a floating point value.

In one example, cameras may be horizontally aligned and different cameras may correspond to different depth ranges. The following shows a specific design corresponding to this example, where camera parameters may be more efficiently coded by using differential coding among multiple views, for example:

```
seq_parameter_set_depth_extension( ) {
    //intrinsic parameters
    focal_length_precision
    focal_length_x_I
    focal_length_y_I_diff_x
    principal_precision
    principal_point_x_I
    principal_point_y_I_diff_x
    //extrinsic parameters
    rotation_xy_half_pi
    rotation_xz_half_pi
    rotation_yz_half_pi
    translation_precision
    anchor_view_id
    zero_translation_present_flag
    if (!zero_translation_present_flag )
        translation_anchor_view_I
    //depth range
    z_near_precision
    z_far_precision
    z_near_integer
    z_far_integer
    for( i = 0; i <= num_views_minus1; i++)
        if (i!= anchor_view_id) {
            translation_diff_anchor_view_I[ i ]
            z_near_diff_anchor_view_I[ i ]
            z_far_diff_anchor_view_I[ i ]
        }
}
```

In this syntax table, a floating point value V may be represented as a decimal value, with its precision P, which represents the number of digits before or after zero, and an integer value I, such that: $V=I*10^P$. When I is a positive value, V is also a positive value, when I is a negative value, V is also a negative value. The following are the intrinsic parameters for the views related to the SPS. Unless further specified or updated, the parameters are the same for any of the related views:

focal_length_precision specifies the precision of the values of focal_length_x and focal_length_y.

focal_length_x_I specifies the integer part of the value of focal_length_x. focal_length_x=focal_length_x_I*$10^{focal\_length\_precision}$ focal_length_y_I_diff_x plus focal_length_x_I specifies the integer part of the value of focal_length_y. focal_length_y=(focal_length_x_I+focal_length_y_y_I_diff_x)*$10^{focal\_length\_precision}$ principal_precision specifies the precision of the values of principal_point_x and principal_point_y.

principal_point_x_I specifies the integer part of the value of principal_point_x. principal_point_x=principal_point_x_I*$10^{principal\_precision}$ principal_point_y_I_diff_x plus principal_point_x specifies the integer part of the value of principal_point_y. principal_point_y=(principal_point_x_I+principal_point_y_I_diff_x)*$10^{principal\_precision}$ The following are the extrinsic parameters for the views related to the SPS. Unless further specified or updated, the parameters are the same for any of the related views.

The rotation matrix R for each camera is represented as follows:

$$R = \begin{bmatrix} R_{yz} & 0 & 0 \\ 0 & R_{xz} & 0 \\ 0 & 0 & R_{xy} \end{bmatrix}$$

rotation_kl_half_pi indicates the diagonal elements of the rotation matrix R, with kl equal to xy, yz, or xz, wherein $$R_{kl} = (-1)^{rotation_{kl}half_{pi}}.$$

This flag equal to 0 specifies $R_{kl}=1$; this flag equal to 1 specifies $R_{kl}=-1$.

translation_precision specifies the precision of the values of translations of all the related views. The precision of translation values as specified in this SPS applies to all the translation values of the view components referencing to this SPS.

anchor_view_id specifies the view_id of the view, the translation of which is used as an anchor to calculate the translation of the other views. The translation of the view with view_id equal to anchor_view_id is equal to 0 when zero_translation_present_flag is equal to 0, otherwise, the translation is signalled.

z_near_precision specifies the precision of the value of z_near. The precision of z_near as specified in this SPS applies to all the z_near values of the view components referencing to this SPS.

z_far_precision specifies the precision of the value of z_near. The precision of z_far as specified in this SPS applies to all the z_far values of the view components referencing to this SPS.

z_near_integer specifies the integer part of the value of z_near. z_near=z_near_integer*$10^{z\_near\_precision}$ z_far_integer specifies the integer part of the value of z_far. z_far=z_far_integer*$10^{z\_far\_precision}$ (When the depth range values are different for different views, z_near and z_far specifies the depth range of the anchor view)

zero_translation_present_flag equal to 1 indicates that the translation of the view with view_id_equal to anchor_view_id is 0; this value equal to 0 indicates the translation of the view with view_id equal to anchor_view_id is signalled.

translation_anchor_view_I specifies the integer part of the translation of the anchor view. translation_anchor_view=translation_anchor_view_I*$10^{translation\_precision}$ translation_anchor_view_I is inferred to be 0 when zero_translation_present_flag is equal to 1.

translation_diff_anchor_view_I[i] plus translation_anchor_view_I specifies the integer part of the translation of the view with view_id equal to i, denoted as translation_view[i].

translation_view[i]=(translation_anchor_view_I+translation_diff_anchor_view_I[i])*$10^{translation\_precision}$ (Denote the integer part of the translation_view[i] as translation_view_I[i])

z_near_diff_anchor_view_I plus z_near_Integer specifies the integer part of the nearest depth value of the view with view_id equal to i, denoted as z_near[i].

z_near[i]=(z_near_diff_anchor_view_I[i]+z_near_Integer)*$10^{z\_near\_precision}$ (Denote the integer part of the z_near[i] as z_near_I[i])

z_far_diff_anchor_view_I plus z_far_Integer specifies the integer part of the farthest depth value of the view with view_id equal to i, denoted as z_far[i].

z_far[i]=(z_far_diff_anchor_view_I[i]+z_far_Integer)*$10^{z\_far\_precision}$ (Denote the integer part of the z_far[i] as z_far_I[i])

In this example design, a value is represented as V=I*$10^P$. In another example, the value maybe represented with other bases, such as V=I*$b^P$ wherein b maybe equal to 2, 8, or 16. In one example, focal_length_x_I, principal_point_x_I, translation_anchor_view_I, z_near_integer and z_far_integer may be signaled as fixed length coding, e.g., with a default length of 32 bit, or with a signalled length of N-bit.

In some examples, the depth range or the extrinsic camera parameter (e.g., translation) of a view may change in a picture basis or may be updated. The updated depth range or camera parameters may be applicable to the view components of the current access unit and the following view components in the bitstream, until a new PPS contains the PPS depth extension following the current PPS updates those values for the related views. In another example, a PPS containing a PPS depth extension may be assigned as a different NAL unit type, in that case, the PPS depth extension itself forms a RBSP.

In another example, a view parameter set with a different NAL unit type may be introduced to signal the change of depth range and translation. The depth range and the translation of the camera may change in a picture basis. The updated depth range or camera parameters may be applicable to the view components of the current access unit and the following view components in the bitstream, until a new VPS following the current VPS updates those values for the related views. The syntax elements may have the same semantics as for the PPS extension. A view parameter set may directly refer to the currently active SPS containing the depth extension.

In some examples, the depth range and translation might change dramatically after a while, so it may become less efficient if the VPS only refers directly to SPS. One way to solve this potential problem may be to calculate a view parameter set after parsing the slice header of the first depth view component to know which PPS the VPS is referring to, when the view parameter set refers to a PPS with the depth extension. In another example, a PPS id can be put into the VPS to solve the problem.

In some examples, some view parameter set may be given the same priority as SPS and PPS thus may be signalled out of band. In this example, a flag may be introduced so that the VPS updates the values in the SPS and the following normal VPS refers only to the updated values. In this example, the frame to which the VPS may be signalled.

The depth range and the translation of the camera may change on a picture basis. The updated depth range or camera parameters may be applicable to the view components of the current access unit and the following view components in the bitstream, until a new PPS contains the PPS depth extension following the current PPS updates those values for the related views.

In one example, picture parameter set syntax may be as follows:

```
pic_parameter_set_rbsp( ) {
    pic_parameter_set_id
    ...
    if (profile_idc = = 3DV_profile) {
        update_depth_translation_flag
        if (update_depth_translation_flag)
            pic_parameter_set_depth_ext( )
    }
    rbsp_trailing_bits( )
}
pic_parameter_set_depth_ext( ) {
    base_pic_parameter_set_id
    z_near_diff_integer_anchor
    z_far_diff_integer_anchor
    if (!zero_translation_present_flag )
        delta_translation_anchor_view_I
    for( i = 0; i <= num_views_minus1; i++)
        if (i!= anchor_view_id) {
            delta_translation_diff_anchor_view_I[ i ]
            z_near_diff_update_anchor_view_I[ i ]
            z_far_diff_update_anchor_view_I[ i ]
        }
    rbsp_trailing_bits( )
}
```

Where base_pic_parameter_set_id specifies the id of the picture parameter set to which the current picture parameter set refers. The corresponding parameter set might be a normal picture parameter set or a picture parameter set extension.

z_near_diff_integer_anchor plus z_near_integer specifies the integer part of the new nearest depth of the anchor view.

z_far_diff_integer_anchor plus z_far_integer specifies the integer part of the new farthest depth of the anchor view.

delta_translation_anchor_view_I plus specifies the difference between the integer parts the new translation of the anchor view and the previous translation of the anchor view. This value is inferred to be 0 if zero_translation_present_flag is equal to 1.

delta_translation_diff_anchor_view_I[i] plus translation_diff_anchor_view_I[i], as specified in the SPS, specifies the difference between translation_anchor_view_I and integer part of the new translation of the view with view_id equal to i.

new_translation_view_I[i]=(delta_translation_diff_anchor_view_I[i]+translation_diff_anchor_view_I[i]+new_translation_anchor_view_I)*$10^{translation\_precision}$ or new_translation_view_I[i]=(delta_translation_diff_anchor_view_I[i]+translation_view_I[i]+new_translation_anchor_view_I−translation_anchor_view_I)*$10^{translation\_precision}$ In some examples, the anchor view translations are always 0, so the second formula may be simpler. In other examples, this value may be used directly to signal the difference between the integer parts of the new translation of the view with view_id equal to i and the corresponding translation signaled in SPS.

translation_diff_update_anchor_view_I[i] specifies the difference between the integer parts the new translation of the view with view_id equal to i and the translation calculated with the signalling in the SPS for the same view.

new_translation_view_I[i]=(translation_diff_update_anchor_view_I[i]+translation_view_I[i])*$10^{translation\_precision}$ In this example, the syntax name may be changed from delta_translation_diff_anchor_view_I[i] to translation_diff_update_anchor_view_I[i]. The previous values the current PPS is referring to are the values defined in the SPS, if the base_pic_parameter_set_id corresponds to a normal picture parameter set; otherwise (the base_pic_parameter_set_id corresponds to a picture parameter set depth extension) the previous values are the values signalled by the reference (base) picture parameter set.

In another, a PPS containing a PPS depth extension may be assigned as a different NAL unit type, in that case, the PPS depth extension itself forms a RBSP:

```
pic_parameter_set_depth_ext_rbsp( ) {
    base_pic_parameter_set_id
    pic_parameter_set_id
    z_near_diff_integer_anchor
    ...
    rbsp_trailing_bits( )
}
```

Where base_pic_parameter_set_id specifies id of the picture parameter set to which the current picture parameter set refers. The corresponding parameter set might be a normal picture parameter set or a picture parameter set extension.

pic_parameter_set_id specifies the picture parameter set id of the current picture parameter set extension.

In one example, the normal picture parameter sets and the picture parameter set depth extensions share the same numbering system.

In some examples, a view parameter set (e.g., with a different NAL unit type) may be introduced to signal the changes of depth range and translation.

```
view_parameter_set_rbsp( ) {
    z_near_diff_integer_anchor
    z_far_diff_integer_anchor
    if (!zero_translation_present_flag )
        delta_translation_anchor_view_I
    for( i = 0; i <= num_views_minus1; i++)
        if (i!= anchor_view_id) {
            delta_translation_diff_anchor_view_I[ i ]
            z_near_diff_update_anchor_view_I[ i ]
            z_far_diff_update_anchor_view_I[ i ]
        }
    rbsp_trailing_bits( )
}
```

In some examples, the depth range and the translation of the camera may change in a picture basis. The updated depth range or camera parameters may be applicable to the view components of the current access unit and the following view components in the bitstream, until a new VPS following the current VPS updates those values for the related views. If a VPS is present in an access unit of bitstream, the VPS may be put before any view components of an access unit. The syntax elements may have the same semantics as for the PPS extension. A view parameter set may directly refer to the currently active SPS containing the depth extension.

In some examples, the depth range and translation may change dramatically after a while, so it may not be as efficient if the VPS only refers directly to SPS. In this example, a view parameter set may refer to a PPS with the depth extension, and it can be calculated after parsing the slice header of the first depth view component to know which PPS the VPS is referring to. In another example, a PPS id may be put into the VPS, as shown below:

```
view_parameter_set_rbsp( ) {
    pic_parameter_set_id
    z_near_integer_anchor
    ...
    rbsp_trailing_bits( )
}
```

In some examples, some view parameter sets may be given the same priority as SPS and PPS and may therefore be signalled out of band. In this example, a flag may be introduced so that the VPS updates the values in the SPS and the following normal VPS may refer to the updated values. In this example, the first frame where the VPS is applied to is signalled. If such a VPS not received by decoding a reference frame with a frame_num_equal to start_frame_num, it may be considered lost. In another example, a POC value may also be signalled.

```
view_parameter_set_rbsp( ) {
    update_SPS_parameter_flag
    if (update_SPS_parameter_flag)
        start_frame_num
    z_near_integer_anchor
    ...
    rbsp_trailing_bits( )
}
```

FIG. 4A is a conceptual diagram illustrating an example MVC prediction pattern. FIG. 4A provides an example coding scheme for inter-view prediction. In general, an encoded frame of MVC video data may be predictively encoded spatially, temporally, and/or with reference to frames of other views at a common temporal location. Accordingly, reference views, from which other views are predicted, generally are decoded before the views for which the reference views act as reference, so that these decoded views can be used for reference when decoding referential views. The decoding order does not necessarily correspond to the order of the view_ids. Therefore, the decoding order of views is described using view order indexes. View order indexes are indexes that indicate the decoding order of corresponding view components in an access unit.

In the example of FIG. 4A, eight views (having view IDs "S0" through "S7") are illustrated, and twelve temporal locations ("T0" through "T11") are illustrated for each view. That is, each row in FIG. 4A corresponds to a view, while each column indicates a temporal location. Although MVC has a so-called base view which is decodable by H.264/AVC decoders and stereo view pair could be supported also by MVC, the advantage of MVC is that it could support an example that uses more than two views as a 3D video input and decodes this 3D video represented by the multiple views. A renderer of a client having an MVC decoder may expect 3D video content with multiple views.

Frames in FIG. 4A are indicated at the intersection of each row and each column in FIG. 4A using a shaded block including a letter, designating whether the corresponding frame is intra-coded (that is, an I-frame), or inter-coded in one direction (that is, as a P-frame) or in multiple directions (that is, as a B-frame). In general, predictions are indicated by arrows, where the pointed-to frame uses the point-from object for prediction reference. For example, the P-frame of view S2 at temporal location T0 is predicted from the I-frame of view S0 at temporal location T0.

As with single view video encoding, frames of a multi-view video coding video sequence may be predictively encoded with respect to frames at different temporal locations. For example, the b-frame of view S0 at temporal location T1 has an arrow pointed to it from the I-frame of view S0 at temporal location T0, indicating that the b-frame is predicted from the I-frame. Additionally, however, in the context of multiview video encoding, frames may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references. he inter-view prediction in MVC may be supported by disparity compensation, which uses the syntax of the H.264/AVC motion compensation, but allows a picture in a different view to be put as a reference picture.

FIG. 4A provides various examples of inter-view prediction. Frames of view S1, in the example of FIG. 4A, are illustrated as being predicted from frames at different temporal locations of view S1, as well as inter-view predicted from frames of frames of views S0 and S2 at the same temporal locations. For example, the b-frame of view S1 at temporal location T1 is predicted from each of the B-frames of view S1 at temporal locations T0 and T2, as well as the b-frames of views S0 and S2 at temporal location T1.

In the example of FIG. 4A, capital "B" and lowercase "b" are intended to indicate different hierarchical relationships between frames, rather than different encoding methodologies. In general, capital "B" frames are relatively higher in the prediction hierarchy than lowercase "b" frames. FIG. 4A also illustrates variations in the prediction hierarchy using different levels of shading, where a greater amount of shading (that is, relatively darker) frames are higher in the prediction hierarchy than those frames having less shading (that is, relatively lighter). For example, all I-frames in FIG. 4A are illustrated with full shading, while P-frames have a somewhat lighter shading, and B-frames (and lowercase b-frames) have various levels of shading relative to each other, but always lighter than the shading of the P-frames and the I-frames.

Figure 4B:
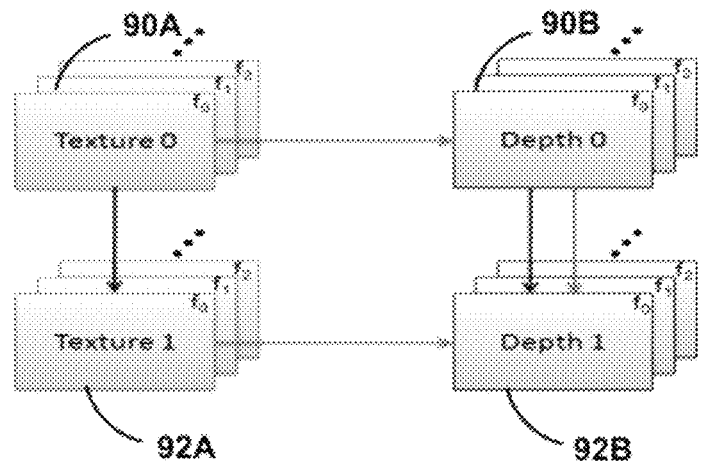
FIG. 4B is a conceptual diagram illustrating Multiview Video Coding (MVC) compatible Multiview Video-plus Depth (MVD) coding for two views.

FIG. 4B is a conceptual diagram illustrating Multiview Video Coding (MVC) compatible Multiview Video-plus Depth (MVD) coding for two views. Each "view" in an MVC coded bitstream may include a plurality of view components, each corresponding to specific temporal instances during playback. Each view component may include texture data and depth data. FIG. 4B is a specific instance of MVC employing stereo video coding, as there are only two views. Nevertheless, the data of a bitstream assembled according to FIG. 4B may be used to produce more than two output views, because of the included depth information, which may be utilized to synthesize other views.

In one example, one or more cameras may be utilized to capture and provide video data that is used to produce the texture and depth components. The video data captured by the camera is texture information. In one example, stereo camera pairs may be used to calculate the depth map for texture component. In another example, a depth sensor (e.g., RADAR, LADAR, or the like) may determine depth maps for a view. Determination of a depth component may be performed by a depth processing unit 21 of source device 12 of FIG. 1. In one example, the depth processing unit may be incorporated into video decoder 22.

In the example of FIG. 2B, at each instant in time, two views may be obtained, view 0 and view 1. View 0 comprises texture component 90A (e.g., texture 0) and depth component 90B (e.g., depth 0), and view 1 comprises texture component 92A (e.g., texture 1) and depth component 92B (e.g., depth 1). In the example of FIG. 4B, each of components 90A, 90B, 92A, and 92B may refer to the corresponding components of the two views at a common temporal instance, f0, for example. The same components may be determined at subsequent temporal instances, f1, f2, and so forth. While the techniques are described with reference to the components at f0, it should be understood that the same techniques may apply similarly to the components at other temporal instances, f1, f2, and so forth.

The texture of the two views maybe coded in an MVC-compatible MVD coding, which may generally resemble MVC as extended in accordance with the techniques of this disclosure to accommodate including depth information in the same bitstream as the texture information, while maintaining their separation.

Using the techniques of this disclosure, depth maps of each of the two views may be predicted using other information corresponding to the same view or the other view. In one example, the depth map associated with a depth component may be predicted using motion prediction from texture to depth map. For example, depth component 90B may be predicted using texture component 90A, and depth component 92B may be predicted using texture component 92A.

In another example, the depth map of one view maybe predicted using inter-view disparity prediction from one view to the other (the inter-view prediction in MVC). For example, depth component 92B may be predicted relative to depth component 90B. In the same manner, texture component 92A may be predicted relative to texture component 90A.

In yet another example, the depth map of a view may be predicted using view synthesis prediction, which may utilize camera parameters associated with the view. If camera parameters of each of the views are available, a virtual current view may be synthesized from a reference view and its corresponding depth map using techniques such as, for example, DIBR techniques. The synthesized virtual view may be used to predict and encode another view. In one example, for depth map view synthesis prediction, the reference view may be the depth map itself. Therefore, camera parameters and one reference depth map may be sufficient to synthesize a virtual current depth map.

As discussed above, the techniques of this disclosure may include signaling camera parameters for a view. The camera parameters may include, for example, intrinsic parameters and extrinsic parameters. Intrinsic parameters may include, for example, focal length and principle point offset in the horizontal direction. Extrinsic parameters may include, for example, real-world horizontal camera location for each view. Typically, each view of a multi-view sequence will share the same intrinsic parameters. Therefore, these parameters may be signaled once for the sequence, such that the signaled intrinsic parameters apply to all views of the sequence.

In one example, the intrinsic and extrinsic camera parameters may be signaled in a three-dimensional video data (3DV) sequence parameter set (SPS), or SPS 3DV extension. The SPS 3DV extension may further describe depth value to real-world z value mapping, which may include depth range and default depth to z-value conversion functions, and/or a table containing depth value to real-world z value for each camera setting. The SPS 3DV extension may also describe a prediction relationship of depth map views and texture views, which may be utilized in motion prediction from texture to depth map.

Figure 4C:
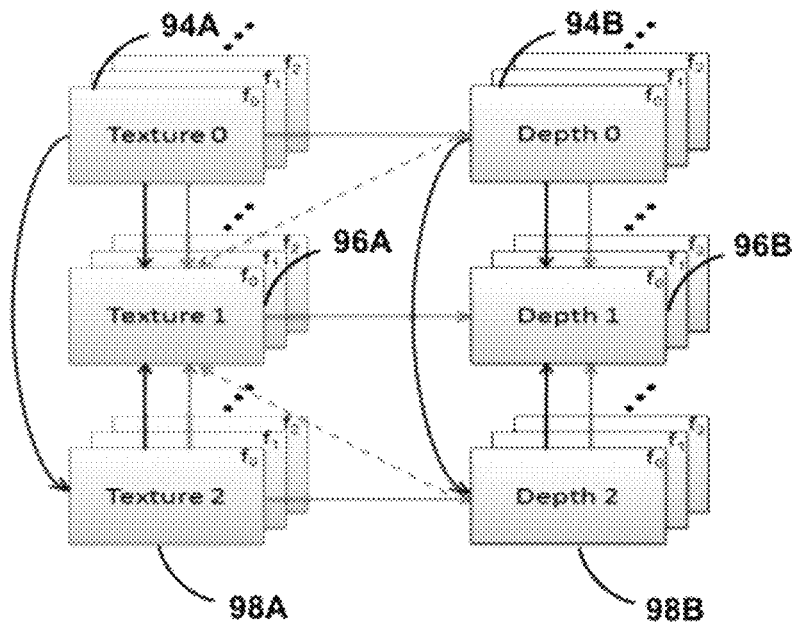
FIG. 4C is a conceptual diagram illustrating MVC-compatible MVD coding for three or more views.

FIG. 4C is a conceptual diagram illustrating MVC-compatible MVD coding for three or more views. For illustrative purposes, the example of FIG. 4C shows 3 views, but it should be understood that these techniques may be utilized for 3 or more views. In one example, each of the views may be obtained by a camera from a different perspective and each view may comprise texture and depth information. In other examples, some views may be obtained from different perspectives, and other views may be synthesized using the components of the obtained views. At each instant in time, three views may be obtained, view 0, view 1, and view 2. View 0 comprises texture component 94A (e.g., texture 0) and depth component 94B (e.g., depth 0), view 1 comprises texture component 96A (e.g., texture 1) and depth component 96B (e.g., depth 1), and view 2 comprises texture component 98A (e.g., texture 2) and depth component 98B (e.g., depth 2).

Depth maps associated with each of the views may be predicted, as discussed above, using depth maps of other view or using texture information of the same view. Additionally, texture information of one view may be predicted using texture information of one or more other views. In the example of FIG. 4B, for a third view texture may be also predicted from the texture and depth maps of one or more other views. In this example, the third view may be predicted using the inter-view prediction modes defined in MVC. Blocks of the third view may also be predicted using view synthesis prediction, which may rely on the texture and depth map of the first view and the second view.

As noted above, techniques of this disclosure may utilize SPS 3DV extension to signal certain parameters that may be used in predicting texture and depth information. The SPS 3DV extension may describe camera parameters, depth value to real-world z value mapping, and/or prediction relationship of depth map views and texture views.

The camera parameters may include intrinsic parameters and extrinsic parameters. Intrinsic parameters may include the focal length and the principle point offset in the horizontal direction. Multi-view sequences usually share the same focal length and principle point offset in the horizontal direction. Therefore, in implementation, for intrinsic parameters, two float numbers may be utilized for all views. Extrinsic parameters may include camera horizontal location of each view. Multi-view sequences are typically captured by a parallel camera array where all cameras may have the same orientation in the world coordinates. Cameras may be placed in a line so that their positions only differ in the horizontal direction. Therefore, the number of extrinsic parameters equals to the number of views. For example, for N view case, N float numbers may be utilized for extrinsic parameters.

In one example, depth value to real-world z value mapping may be achieved using depth range and default depth to z value conversion functions. In other examples, where other conversion functions may differ from the default functions, a table containing depth value to real-world z value may be included for each camera setting. In one example, conversion between depth value and real-world z value may be used in view synthesis to predict views, e.g., virtual view, from one or more coded views. That is, a depth value mapped to a real-world z value may be expressed in a real-world depth range, which may indicate a horizontal offset needed when producing the virtual view to provide the proper 3D effect.

Prediction relationship of depth map views and texture views may be also described by a SPS 3DV extension. The prediction relationship of depth map views follows the prediction relationship of the view synthesis. Therefore, if the texture of view 0 depends on the texture of view 1 based on inter-view prediction, the depth map of view 0 may depend on view 1. If texture of view 0 does not depend on the texture of view 1, then depth map of view 0 likely does not depend on the depth map of view 1. For each of the above prediction relations, i.e., whether the depth map of view 0 depends on the depth map of view 1 under the condition that the texture of view 0 depends on the texture of view 1, a flag may be signaled to indicate whether a predictive relationship exists. Additionally, an SEI message may be added to provide more details about changes of the prediction relationship. In that manner, an SEI message may be associated to a sub-sequence which has the specific flag equal to true while another SEI message associated to another sub-sequence which has the specific flag equal to false.

As discussed above, VCL NAL units corresponding to the same temporal instance for a view may be treated as a common view component. Techniques of this disclosure may provide for coding texture data and depth map data for a view consecutively in the bitstream. Typically, a depth component, if exists, always follows its corresponding texture component in the bitstream order. To separate the texture and depth map information of a view component, this techniques of this disclosure propose adding a delimiter in the bitstream, e.g., a NAL unit delimiter that indicates the end of the texture data and the beginning of the depth information for the view component.

Additionally or alternatively, texture and depth VCL NAL units may include a flag in the NAL unit header that indicates whether the NAL unit includes texture or depth information. This flag may be referred to as a depth flag, having a value of 0 to indicate that the NAL unit includes texture information, or a value of 1 to indicate that the NAL unit includes depth information. This NAL unit header may correspond to a new NAL unit type. Moreover, NAL unit header information may be provided to indicate whether the NAL unit is used to predict any coded texture picture of a view. For example, one bit may be added in the VCL NAL unit of a depth map, to indicate whether this VCL NAL unit will be used to predict any coded picture of the texture of a view.

Figure 4D:
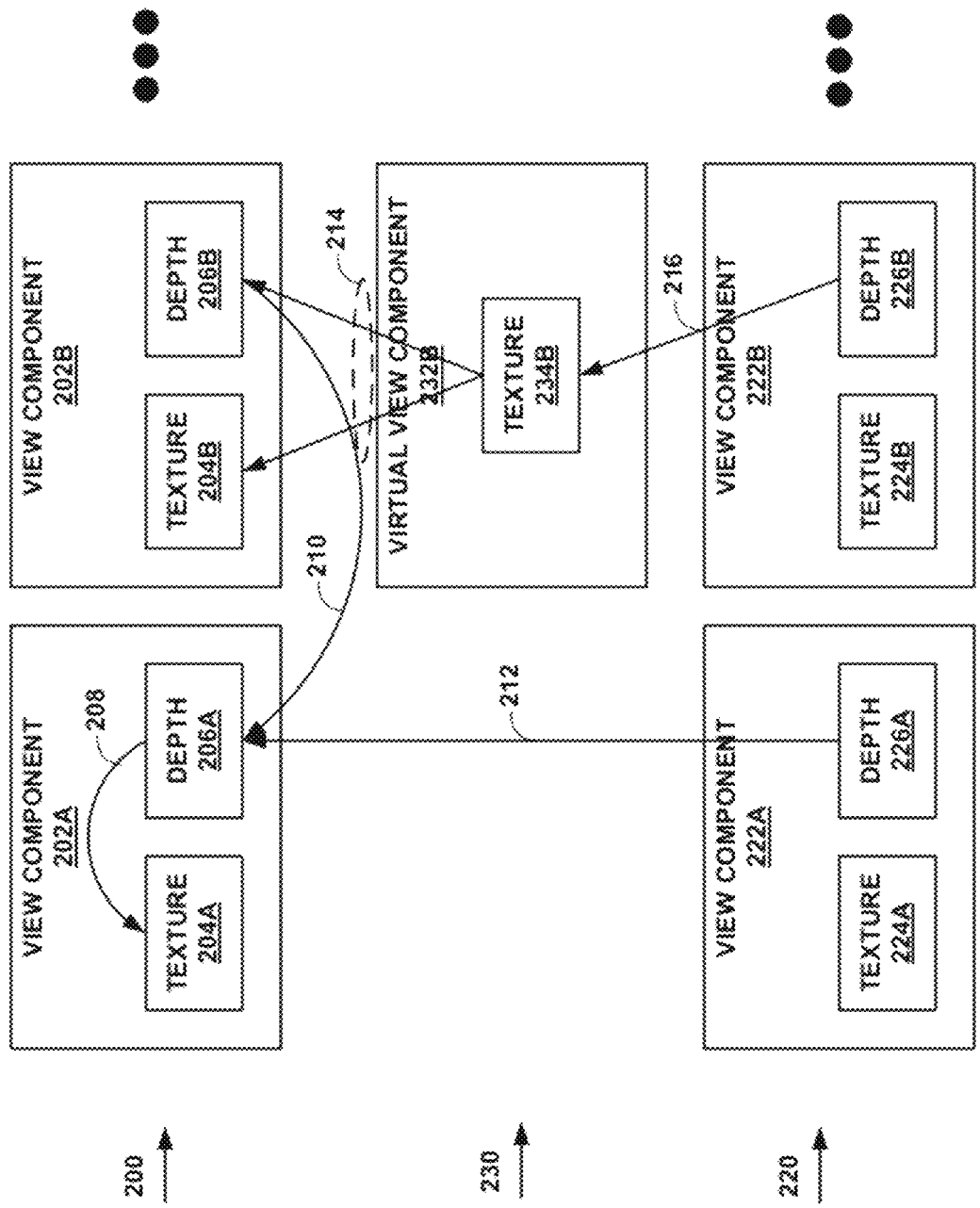
FIG. 4D is a conceptual diagram illustrating MVC-compatible MVD coding for multiple views.

FIG. 4D is a conceptual diagram illustrating MVC-compatible MVD coding for multiple views. In this example, video data corresponding to different views may be obtained, for example, each by a camera from a different perspective, at different temporal instances. In this example, views 200 and 220 may correspond to two different views. Video data associated with view components 202A and 222A maybe obtained at the same time instance and video data associated with view components 202B and 222B may be obtained at the same time instance, that is subsequent to the time at which video data associated with view components 202A and 222A were obtained.

Each of view components 202A, 222A, 202B, and 222B may comprise a texture component and a depth component. The texture component may correspond to data captured by a camera. Depth components may be encoded relative to components from the same view, or other views. In the example of FIG. 4D, depth component 206A is predicted relative to texture component 204A of the same view component 202A. In this example, depth component 206B is predicted relative to depth component 206A of another view component 202A of the same view (e.g., view 200), thus illustrating an example using intra-view prediction. In another example, inter-view prediction may be used, such as predicting depth component 226A of view 220 relative to depth component 206A of another view 200.

In one example, view synthesis prediction may be utilized to synthesize a virtual view 230 using captured view 200. In this example, the virtual view component 232B may comprise texture component 234B, which may be formed, e.g., interpolated, based on data of one or more components from other views, e.g., texture component 204B and depth component 206B of view component 202B. A synthesized virtual component may be also utilized to predict other components. In this example, depth component 226B of view component 222B is predicted relative to texture component 234B.

Figure 5:
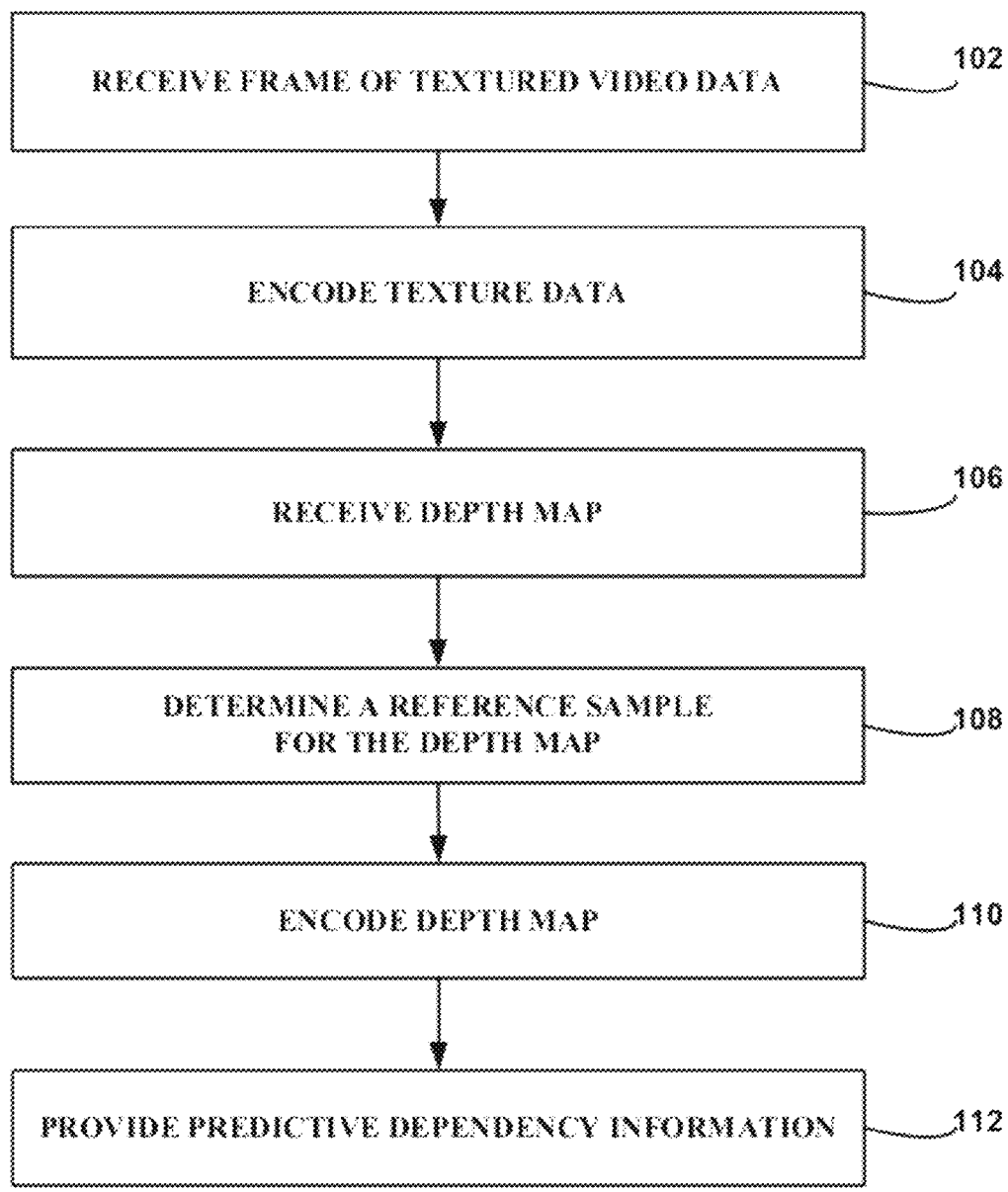
FIG. 5 is a flow diagram illustrating an example operation of a video encoder consistent with this disclosure.

FIG. 5 is a flow diagram illustrating an example operation of a video encoder consistent with this disclosure. The technique of FIG. 5 will be described from the perspective of video encoder 22 of FIG. 2, although other devices may perform similar techniques.

Video encoder 22 may obtain a frame of texture video data (102). In other examples, video encoder 22 may receive a slice or other coded unit including one or more blocks of video data In some examples, frames from two or more views may be obtained by video encoder 22, where the two or more view may correspond to two or more cameras. Video encoder 22 may encode texture data for a view component of a view (104), where the view component includes both the frame (or slice) of texture video data, as well as, the frame (or slice) depth video data for a common temporal instance. Encoding may include any or all of intra- or inter-view encoding of the frame.

Video encoder 22 may further receive a depth map corresponding to the view component (106). The depth map may include depth information for regions of pixels in the video frame. The depth map may have the same or a different resolution than that of the texture components. In one example, the depth map may be determined by a depth processing unit.

Video decoder 22 may determine reference sample for blocks of the depth map (108). In one example, the reference sample may be a component in the same view component, a component in the same view but temporally separate view component, or a component in a different view. In one example, determining the reference samples may include analyzing texture data for the same view components or depth of a previously-coded view component in the same view. Video decoder 22 may then encode the depth map relative to the determined reference sample (110). Video decoder 22 may provide predictive dependency information indicating the determined reference sample (112). The information may include predictive dependencies associated with the prediction of the depth map. The predictive dependency information may describe reference frames or reference slices used to predict data of the current frame or slice being coded (e.g., a view identifier, POC value, or the like).

The encoded components from each view component may be encapsulated together in one bitstream, while remaining separate, by including a depth flag in the header of the NAL unit to indicate whether the NAL unit corresponds to a texture component or a depth component. In one example, encapsulating the texture and depth data may include using NAL units for each of the texture and depth components, where a flag may be utilized in the header of the NAL unit to indicate whether NAL unit is a texture or depth NAL unit. Additionally, a delimiter NAL unit may be provided between the texture data and the depth data NAL unit in the common bitstream to indicate where the texture NAL unit ends and where the depth NAL unit starts.

In one example, encapsulating the texture and depth data may comprise encapsulating the texture data as a first network abstraction layer (NAL) unit and encapsulating the depth data as a second NAL unit, where the first NAL unit and the second NAL unit correspond to instances of the same type of NAL unit. In one example, the first NAL unit may comprise a first NAL unit header including a flag indicative of whether the first NAL unit includes texture or depth information, and the second NAL unit may comprise a second NAL unit header including a flag indicative of whether the second NAL unit includes texture or depth information. In one example, a value of the flag of the first NAL unit header may be set to indicate that the first NAL unit includes texture information and a value of the flag of the second NAL unit header may be set to indicate that the second NAL unit includes depth information. In this manner, during processing of the bitstream containing both the texture and the depth information, the flags in the headers of the NAL units may be utilized to determine where the texture data end and the depth data begins. Therefore, easily separating the two components even though the two components are encapsulated in a common bitstream. This may be also useful in cases where the bitstream may be transmitted to devices that support 3D display and devices that support 2D display, where simple filtering may be utilized in the NAL unit to provide only texture information to the 2D display device.

Using the techniques of this disclosure, information indicating predictive relationship between texture and depth components may be signaled with the bitstream. The predictive relationships may indicate whether a depth component may be predicted using intra- or inter-view prediction, and whether a virtual view component may be formed from texture components and/or depth component of one or more other views. Other signaled information may include camera parameters associated with each of the different views. Using the camera parameters, texture and depth information for the different views may be encoded relative to texture and depth information from a reference view. In this manner, texture and depth information from a subset of the views may be encoded and transmitted in the bitstream. Camera parameters associated with the remaining views may be utilized to generate texture and depth information using the transmitted texture and depth information.

In this manner, the method of FIG. 5 represents an example of a method including receiving texture data for a temporal instance of a view of video data, receiving depth data corresponding to the texture data for the temporal instance of the view of video data, and encapsulating the texture data and the depth data in a view component for the temporal instance of the view, such that the texture data and the depth data are encapsulated within a common bitstream.

Figure 6:
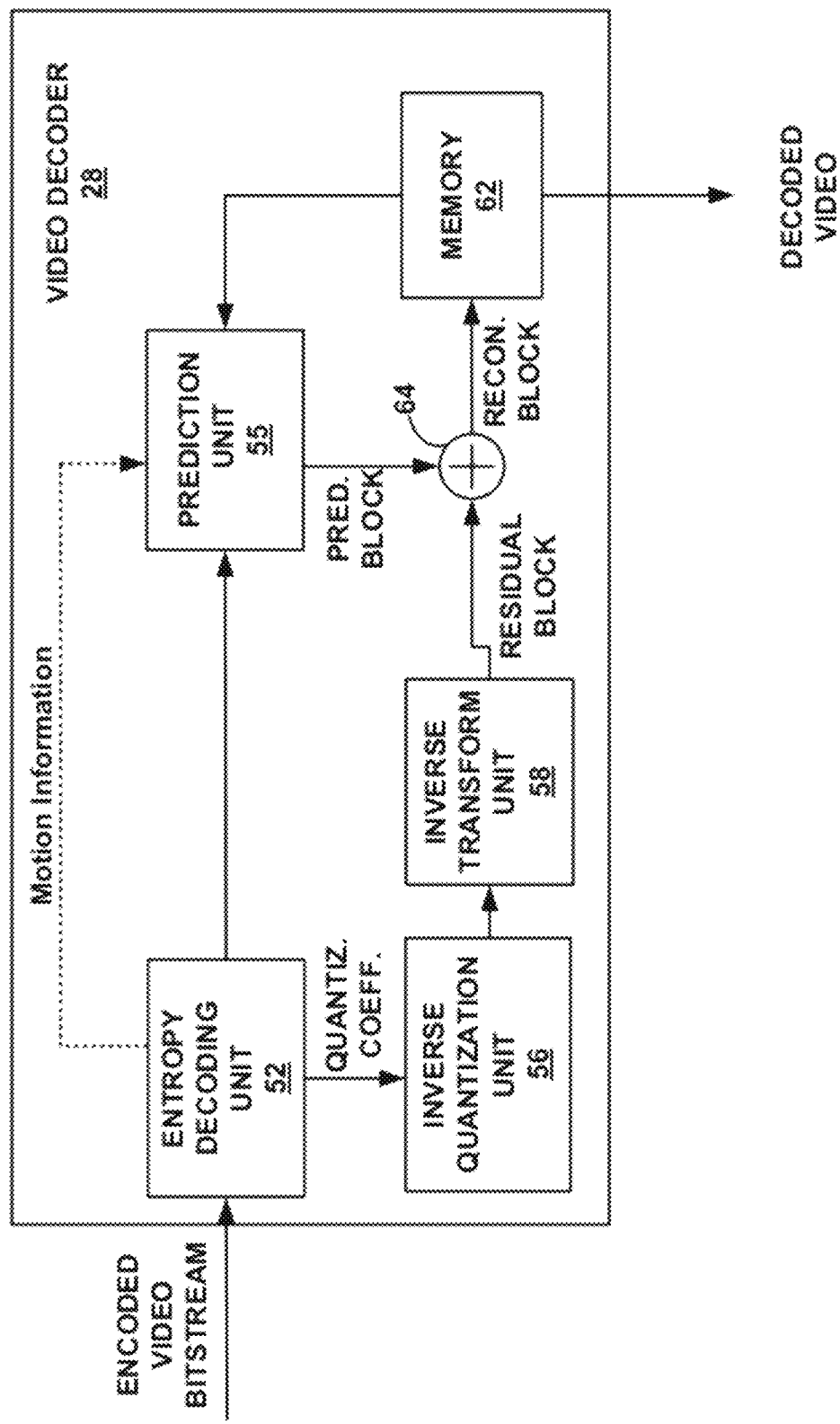
FIG. 6 is a block diagram illustrating an example of the video decoder of FIG. 1 in further detail.

FIG. 6 is a block diagram illustrating an example of a video decoder 28, which may decode a video sequence that is encoded in the manner described herein. Video decoder 28 is one example of a specialized video computer device or apparatus referred to herein as a "coder." As shown in FIG. 6, video decoder 28 corresponds to video decoder 28 of destination device 16. However, in other examples, video decoder 28 may correspond to a different device. In further examples, other units (such as, for example, other encoder/decoder (CODECS)) can also perform similar techniques as video decoder 28.

The encoded video bitstream may include encapsulated texture and depth components associated with view components, as described above. The bitstream may include NAL units associated with each of the texture and depth components. A flag in the header of each NAL unit may indicate whether the NAL unit is a texture component NAL unit or a depth component NAL unit. Additionally, an NAL delimiter may indicate where the texture NAL unit ends and the depth NAL unit starts. The bitstream may also include signals indicating predictive dependencies of each of the components, as described in detail above. Video decoder 28 may determine whether a NAL unit includes texture or depth information using a delimiter NAL unit, or a depth flag in a NAL unit header.

Video decoder 28 includes an entropy decoding unit 52 that entropy decodes the components of the received bitstream to generate quantized coefficients and the prediction syntax elements. The bitstream may include two-component coded blocks having texture components and a depth component for each pixel location in order to render a 3D video. The prediction syntax elements may include a coding mode, one or more motion vectors, information identifying an interpolation technique used, coefficients for use in interpolation filtering, and indication of predictive relationship between texture and depth components of the same view and relative to other views. The bitstream may also be associated with signaled camera parameters associated with the corresponding view of the components of the bitstream.

The prediction syntax elements, e.g., the coefficients, are forwarded to prediction unit 55. If prediction is used to code the coefficients relative to coefficients of a fixed filter, or relative to one another, prediction unit 55 can decode the syntax elements to define the actual coefficients. Also, if quantization is applied to any of the prediction syntax, inverse quantization unit 56 may also remove such quantization. Inverse quantization unit 56 may treat the depth and texture components for each pixel location of the coded blocks in the encoded bitstream differently. For example, the depth component may have been quantized differently than the texture components. Therefore, inverse quantization unit 56 may process the depth and texture components separately. Filter coefficients, for example, may be predictively coded and quantized according to this disclosure, and in this case, inverse quantization unit 56 may be used by video decoder 28 to predictively decode and de-quantize such coefficients.

Prediction unit 55 may generate prediction data based on the prediction syntax elements and one or more previously decoded blocks that are stored in memory 62, in much the same way as described in detail above with respect to prediction unit 32 of video encoder 22. In particular, prediction unit 55 may perform one or more of the multi-view video plus depth techniques of this disclosure during motion compensation and/or intra prediction to generate prediction blocks for respective depth components and texture components. The prediction block (as well as a coded block) may have different resolution for the depth components versus the texture components. For example, the depth components may have quarter-pixel precision while the texture components have full-integer pixel precision. As such, one or more of the techniques of this disclosure may be used by video decoder 28 in generating a prediction block. Prediction unit 55 may include a motion compensation unit that comprises filters used for interpolation and interpolation-like filtering techniques of this disclosure. The motion compensation component is not shown in FIG. 6 for simplicity and ease of illustration.

Inverse quantization unit 56 inverse quantizes, i.e., dequantizes, the quantized coefficients. The inverse quantization process may be a process defined for H.264 decoding or for any other decoding standard. Inverse transform unit 58 applies an inverse transform, e.g., an inverse DCT or conceptually similar inverse transform process, to the transform coefficients in order to produce residual blocks in the pixel domain. Summer 64 sums the residual block with the corresponding prediction block generated by prediction unit 55 to form a reconstructed version of the original block encoded by video encoder 22. If desired, a deblocking filter may also be applied to filter the decoded blocks in order to remove blockiness artifacts. The decoded video blocks are then stored in memory 62, which provides reference blocks for subsequent motion compensation and also produces decoded video to drive display device (such as device 28 of FIG. 1).

The decoded video may be used to render 3D video. The 3D video may comprise a three dimensional virtual view. Depth information may be used to determine a horizontal offset (horizontal disparity) for each pixel in the block. Occlusion handling can also be performed to generate the virtual view. In one example, video decoder 28 may transmit the decoded video to different display devices, including 2D display devices. In this example, video decoder 28 may send only the decoded texture component to the display device, but not the depth component. In one example, video decoder, the display, or an intermediate unit may generate a synthesized view using the texture and depth information.

Figure 7:
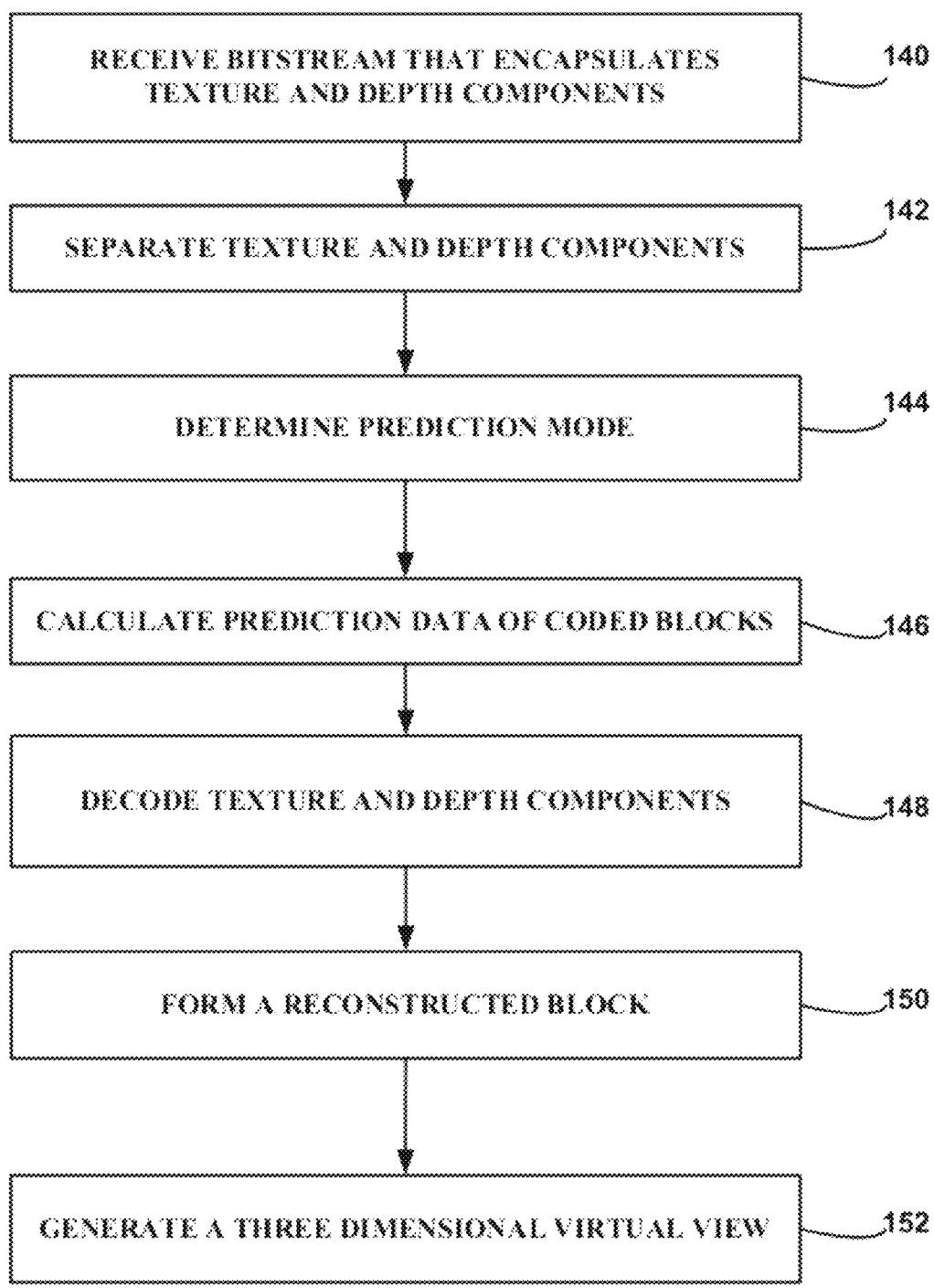
FIG. 7 is a flow diagram illustrating an example operation of a video decoder consistent with this disclosure.

FIG. 7 is a flow diagram illustrating an example operation of a video decoder consistent with this disclosure. Thus, the process of FIG. 7 may be considered the reciprocal decoding process to the encoding process of FIG. 5. FIG. 7 will be described from the perspective of video decoder 28 of FIG. 6 although other devices may perform similar techniques.

Video decoder 28 may receive a bitstream that includes encapsulated texture and depth components of a view component (140). Video decoder 28 may separate the bitstream into the texture and the depth component, which may be encoded (142) Video decoder 28 may also obtained signaled information within the bitstream, e.g., predictive dependencies between the texture and depth data of the same view and relative to texture and depth data of other views and camera parameter associated with view component.

Video decoder 28 determines a prediction mode in order to determine what prediction block the residual coefficients were determined from in the encoder (such as video encoder 22) (144). Based on a determination of the prediction mode, video decoder 28 may calculate prediction data for the coded blocks (146). Using the determined prediction mode and prediction data, video decoder 28 may decode each of the texture and depth components (148). To decode the components, video decoder 28 may use the appropriate signaled prediction relationships and references, and use video decoding functions. For example, video decoder 28 may decode the residual coefficients, which may be inverse quantized (for example, by inverse quantization unit 56) and inverse transformed (for example, by inverse transform unit 58).

Using the decoded residual coefficients, video decoder 28 may combine the residual coefficients with the prediction data to form a reconstructed block (150). From the reconstructed block, video decoder 28 may generate a frame of the image having texture and depth components.

Using the frame having texture components and the depth map, video decoder 28 may generate a three dimensional virtual view of the frame (152). The frame may be combined with other decoded frames to generate a three dimensional virtual view of an image. In some examples, video decoder 28 does not generate the three dimensional virtual view, but rather forwards the frame having the texture components and a depth map to an external rendering device.

In this manner, the method of FIG. 7 represents an example of a method including receiving a common bitstream encapsulating texture data and depth data in a view component for a temporal instance of a view of video data, wherein the depth data corresponds to the texture data for the temporal instance of the view of video data, and separating the texture data and the depth data for the temporal instance of the view of video data.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of this disclosure have been described. These and other examples are within the scope of the following claims.

The invention claimed is:

1. A method of encoding video data, the method comprising:
   receiving a texture view component comprising texture data for a temporal instance of a view of video data;
   receiving a depth view component comprising depth data corresponding to the texture data for the temporal instance of the view of video data;
   encapsulating the texture view component in a first network abstraction layer (NAL) unit followed by the depth view component in a second NAL unit to form a view component for the temporal instance of the view, such that the texture view component and the depth view component are encapsulated within a common bitstream, and such that the first NAL unit is separated from the second NAL unit in the common bitstream;
   signaling the view component;
   signaling, in a five-bit field of a header of the first NAL unit, the five-bit field being associated with a NAL unit type of the first NAL unit, a first indication that the first NAL unit includes the texture data; and
   signaling, in a five-bit field of a header of the second NAL unit, the five-bit field being associated with a NAL unit type of the second NAL unit, a second indication that the second NAL unit includes the depth data.

2. The method of claim 1, wherein the texture data comprises coded slices of a coded frame of texture data and wherein the depth data comprises coded slices of a coded frame of depth data.

3. The method of claim 1, further comprising:
   forming a delimiter NAL unit; and
   positioning the delimiter NAL unit consecutively after the first NAL unit that encapsulates the texture view component and immediately before the second NAL unit that encapsulates the depth view component in the common bitstream.

4. The method of claim 1, further comprising signaling camera parameters for one or more cameras related to views of video data in the bitstream, wherein signaling the camera parameters comprises:
   determining intrinsic camera parameters shared by the views corresponding to the one or more cameras, the intrinsic camera parameters comprising one or more of focal length and principle point offset;

determining extrinsic camera parameters shared by the views corresponding to the one or more cameras;

determining view-specific camera parameters including real-world horizontal locations of the one or more cameras; and forming a sequence level data structure including values indicative of the intrinsic camera parameters, the extrinsic camera parameters, and the view-specific camera parameters.

5. The method of claim 1, further comprising signaling data representing conversion from real-world depth (z) values to depth values represented in the depth data as coded frames, wherein the data representing the conversion comprises data representing at least one of an indication of a linear function for converting the real-world depth (z) values to depth values of the depth view component, an indication of an inverse linear function for converting the real-world depth (z) values to depth values of the depth view component, data representing a range of the real-world depth (z) values, and an indication of a lookup table used to signal the real-word depth (z) values.

6. The method of claim 5, wherein signaling the data representing the conversion comprises forming a NAL unit comprising a unique NAL unit type value and the data representing the conversion, the method further comprising signaling a view parameter set in the common stream in one or more access units, wherein the view parameter set includes information indicative of the range of the real-world depth (z) values.

7. A device for processing video data, the device comprising:

a memory configured to store the video data; and one or more processors implemented in hardware comprising discrete logic circuitry configured to:

receive a texture view component comprising texture data for a temporal instance of a view of the video data, receive a depth view component comprising depth data corresponding to the texture data for the temporal instance of the view of video data, encapsulate the texture view component in a first network abstraction layer (NAL) unit followed by the depth view component in a second NAL unit to form a view component for the temporal instance of the view, such that the texture view component and the depth view component are encapsulated within a common bitstream, such that the first NAL unit is separated from the second NAL unit in the common bitstream;

signal the view component;

signal, in a five-bit field of a header of the first NAL unit, the five-bit field being associated with a NAL unit type of the first NAL unit, a first indication that the first NAL unit includes the texture data; and signal, in a five-bit field of a header of the second NAL unit, the five-bit field being associated with a NAL unit type of the second NAL unit, a second indication that the second NAL unit includes the depth data.

8. The device of claim 7, wherein the texture data comprises coded slices of a coded frame of texture data and wherein the depth data comprises coded slices of a coded frame of depth data.

9. The device of claim 7, wherein the discrete logic circuitry is further configured to:

form a delimiter network abstraction layer (NAL) unit; and position the delimiter NAL unit consecutively after the first NAL unit that encapsulates the texture view component and immediately before the second NAL unit that encapsulates the depth view component in the common bitstream.

10. The device of claim 7, wherein the discrete logic circuitry is further configured to signal camera parameters for one or more cameras related to views of video data in the bitstream, wherein to signal the camera parameters the video encoder is configured to:

determine intrinsic camera parameters shared by the views corresponding to the one or more cameras, the intrinsic camera parameters comprising one or more of focal length and principle point offset;

determine extrinsic camera parameters shared by the views corresponding to the one or more cameras;

determine view-specific camera parameters including real-world horizontal locations of the one or more cameras; and form a sequence level data structure including values indicative of the intrinsic camera parameters, the extrinsic camera parameters, and the view-specific camera parameters.

11. The device of claim 7, wherein the discrete logic circuitry is further configured to signal data representing conversion from real-world depth (z) values to depth values represented in the depth data as coded frames, wherein the data representing the conversion comprises data representing at least one of an indication of a linear function for converting the real-world depth (z) values to depth values of the depth view component, an indication of an inverse linear function for converting the real-world depth (z) values to depth values of the depth view component, data representing a range of the real-world depth (z) values, and an indication of a lookup table used to signal the real-word depth (z) values.

12. The device of claim 11, wherein to signal the data representing the conversion, the discrete logic circuitry is configured to form a NAL unit comprising a unique NAL unit type value and the data representing the conversion, and signal a view parameter set in the common stream in one or more access units, wherein the view parameter set includes information indicative of the range of the real-world depth (z) values.

13. A computer program product comprising a non-transitory computer-readable storage medium having stored thereon instructions that, when executed, cause a processor of a video encoding device to:

receive a texture view component comprising texture data for a temporal instance of a view of video data;

receive a depth view component comprising depth data corresponding to the texture data for the temporal instance of the view of video data;

encapsulate the view component texture in a first network abstraction layer (NAL) unit followed consecutively by the depth view component in a second NAL unit to form a view component for the temporal instance of the view, such that the texture view component and the depth view component are encapsulated within a common bitstream, and such that the first NAL unit is separated from the second NAL unit in the common bitstream;

signal the view component;

signal, in a five-bit field of a header of the first NAL unit, the five-bit field being associated with a NAL unit type of the first NAL unit, a first indication that the first NAL unit includes the texture data;

signal, in a five-bit field of a header of the second NAL unit, the five-bit field being associated with a NAL unit type of the second NAL unit, a second indication that the second NAL unit includes the depth data.

14. The computer program product of claim 13, wherein the texture data comprises coded slices of a coded frame of texture data and wherein the depth data comprises coded slices of a coded frame of depth data.

15. The computer program product of claim 13, wherein the non-transitory computer-readable storage medium further comprises instructions that cause the processor to:
    form a delimiter NAL unit; and
    position the delimiter NAL unit consecutively after the first NAL unit that encapsulates the texture view component and immediately before the second NAL unit that encapsulates the depth view component in the common bitstream.

16. The computer program product of claim 13, further comprising instructions that cause the processor to signal camera parameters for one or more cameras related to views of video data in the bitstream, wherein the instructions to signal the camera parameters comprise instructions that cause the processor to:
    determine intrinsic camera parameters shared by the views corresponding to the one or more cameras, the intrinsic camera parameters comprising one or more of focal length and principle point offset;
    determine extrinsic camera parameters shared by the views corresponding to the one or more cameras;
    determine view-specific camera parameters including real-world horizontal locations of the one or more cameras; and
    form a sequence level data structure including values indicative of the intrinsic camera parameters, the extrinsic camera parameters, and the view-specific camera parameters.

17. The computer program product of claim 13, further comprising instructions that cause the processor to signal data representing conversion from real-world depth (z) values to depth values represented in the depth data as coded frames, wherein the data representing the conversion comprises data representing at least one of an indication of a linear function for converting the real-world depth (z) values to depth values of the depth view component, an indication of an inverse linear function for converting the real-world depth (z) values to depth values of the depth view component, data representing a range of the real-world depth (z) values, and an indication of a lookup table used to signal the real-word depth (z) values.

18. The computer program product of claim 17, wherein the instructions that cause the processor to signal the data representing the conversion comprise instructions that cause the processor to form a NAL unit comprising a unique NAL unit type value and the data representing the conversion, and signal a view parameter set in the common stream in one or more access units, wherein the view parameter set includes information indicative of the range of the real-world depth (z) values.

19. A device for encoding video data, the device comprising:
    means for receiving a texture view component comprising texture data for a temporal instance of a view of video data;
    means for receiving a depth view component comprising depth data corresponding to the texture data for the temporal instance of the view of video data;
    means for encapsulating the texture view component in a first network abstraction layer (NAL) unit followed consecutively by the depth view component in a second NAL unit to form a view component for the temporal instance of the view, such that the texture view component and the depth view component are encapsulated within a common bitstream, and such that the first NAL unit is separated from the second NAL unit in the common bitstream;
    means for signaling the view component;
    means for signaling, in a five-bit field of a header of the first NAL unit, the five-bit field being associated with a NAL unit type of the first NAL unit, a first indication that the first NAL unit includes the texture data; and
    means for signaling, in a five-bit field of a header of the second NAL unit, the five-bit field being associated with a NAL unit type of the second NAL unit, a second indication that the second NAL unit includes the depth data.

20. The device of claim 19, wherein the texture data comprises coded slices of a coded frame of texture data and wherein the depth data comprises coded slices of a coded frame of depth data.

21. The device of claim 19, further comprising:
    means for forming a delimiter NAL unit; and
    means for positioning the delimiter NAL unit consecutively after the first NAL unit that encapsulates the texture view component and immediately before the second NAL unit that encapsulates the depth view component in the common bitstream.

22. The device of claim 19, further comprising means for signaling camera parameters for one or more cameras related to views of video data in the bitstream, wherein the means for signaling the camera parameters comprises:
    means for determining intrinsic camera parameters shared by the views corresponding to the one or more cameras, the intrinsic camera parameters comprising one or more of focal length and principle point offset;
    means for determining extrinsic camera parameters shared by the views corresponding to the one or more cameras;
    means for determining view-specific camera parameters including real-world horizontal locations of the one or more cameras; and
    means for forming a sequence level data structure including values indicative of the intrinsic camera parameters, the extrinsic camera parameters, and the view-specific camera parameters.

23. The device of claim 19, further comprising means for signaling data representing conversion from real-world depth (z) values to depth values represented in the depth data as coded frames, wherein the data representing the conversion comprises data representing at least one of an indication of a linear function for converting the real-world depth (z) values to depth values of the depth view component, an indication of an inverse linear function for converting the real-world depth (z) values to depth values of the depth view component, data representing a range of the real-world depth (z) values, and an indication of a lookup table used to signal the real-word depth (z) values.

24. The device of claim 23, wherein the means for signaling the data representing the conversion comprises means for forming a NAL unit comprising a unique NAL unit type value and the data representing the conversion, and means for signaling a view parameter set in the common stream in one or more access units, wherein the view parameter set includes information indicative of the range of the real-world depth (z) values.

25. A method of decoding video data, the method comprising:
receiving a common bitstream that includes a view component encapsulating a texture view component in a first network abstraction layer (NAL) unit for a temporal instance of a view of the video data followed consecutively by a depth view component in a second NAL unit for the temporal instance of the view of video data, wherein the texture view component comprises texture data for the temporal instance of a view and the depth view component comprising depth data corresponding to the texture data for the temporal instance of the view of video data, and wherein the texture view component and the depth view component are separated in the common bitstream;
receiving the depth data; and
separating the texture view component and the depth view component for the temporal instance of the view of video data based on:
a first indication that the first NAL unit includes the texture view component, the first indication being signaled in a five-bit field of a header of the first NAL unit, the five-bit field being associated with a NAL unit type of the first NAL unit, and
a second indication that the second NAL unit includes the depth view component, the second indication being signaled in a five-bit field of a header of the second NAL unit, the five-bit field being associated with a NAL unit type of the second NAL unit.

26. The method of claim 25, wherein the texture data comprises coded slices of a coded frame of texture data and wherein the depth data comprises coded slices of a coded frame of depth data.

27. The method of claim 25, wherein a delimiter NAL unit consecutively follows the first NAL unit that encapsulates the texture view component, and wherein the delimiter NAL unit is positioned immediately before the second NAL unit that encapsulates the depth view component in the common bitstream.

28. The method of claim 25, further comprising obtaining signaled camera parameters for one or more cameras related to views of video data in the bitstream, wherein the bitstream encapsulates SPS data structure including values indicative of intrinsic camera parameters shared by the views corresponding to the one or more cameras, the intrinsic camera parameters comprising one or more of focal length and principle point offset, extrinsic camera parameters shared by the views corresponding to the one or more cameras, and view-specific camera parameters including real-world horizontal locations of the one or more cameras.

29. The method of claim 25, further comprising obtaining signaled data representing conversion from real-world depth (z) values to depth values represented in the depth data as coded frames, wherein the data representing the conversion comprises data representing at least one of an indication of a linear function for converting the real-world depth (z) values to depth values of the depth view component, an indication of an inverse linear function for converting the real-world depth (z) values to depth values of the depth view component, data representing a range of the real-world depth (z) values, and an indication of a lookup table used to signal the real-word depth (z) values.

30. A device for processing video data, the device comprising:
a memory configured to store video data; and
one or more processors implemented in hardware comprising discrete logic circuitry configured to:
receive a common bitstream that includes a view component encapsulating a texture view component in a first network abstraction layer (NAL) unit for a temporal instance of a view of the video data followed consecutively by a depth view component in a second NAL unit for the temporal instance of the view of the video data, wherein the texture view component comprises texture data for the temporal instance of a view and the depth view component comprising depth data corresponding to the texture data for the temporal instance of the view of video data, and wherein the texture view component and the depth view component are separated in the common bitstream;
receive the depth data; and
separate the texture view component and the depth view component for the temporal instance of the view of video data based on:
a first indication that the first NAL unit includes the texture view component, the first indication being signaled in a five-bit field of a header of the first NAL unit, the five-bit field being associated with a NAL unit type of the first NAL unit, and
a second indication that the second NAL unit includes the depth view component, the second indication being signaled in a five-bit field of a header of the second NAL unit, the five-bit field being associated with a NAL unit type of the second NAL unit.

31. The device of claim 30, wherein the texture data comprises coded slices of a coded frame of texture data and wherein the depth data comprises coded slices of a coded frame of depth data.

32. The device of claim 30, wherein a delimiter NAL unit consecutively follows the first NAL unit that encapsulates the texture view component, and wherein the delimiter NAL unit is positioned immediately before the second NAL unit that encapsulates the depth view component in the common bitstream.

33. The device of claim 30, wherein the discrete logic circuitry is further configured to obtain signaled camera parameters for one or more cameras related to views of video data in the bitstream, wherein the bitstream encapsulates SPS data structure including values indicative of intrinsic camera parameters shared by the views corresponding to the one or more cameras, the intrinsic camera parameters comprising one or more of focal length and principle point offset, extrinsic camera parameters shared by the views corresponding to the one or more cameras, and view-specific camera parameters including real-world horizontal locations of the one or more cameras.

34. The device of claim 30, wherein the discrete logic circuitry is further configured to obtain signaled data representing conversion from real-world depth (z) values to depth values represented in the depth data as coded frames, wherein the data representing the conversion comprises data representing at least one of an indication of a linear function for converting the real-world depth (z) values to depth values of the depth view component, an indication of an inverse linear function for converting the real-world depth (z) values to depth values of the depth view component, data representing a range of the real-world depth (z) values, and an indication of a lookup table used to signal the real-word depth (z) values.

35. A computer program product comprising a non-transitory computer-readable storage medium having stored thereon instructions that, when executed, cause a processor of a video decoding device to:
receive a common bitstream that includes a view component encapsulating a texture view component in a first network abstraction layer (NAL) unit for a temporal instance of a view of the video data followed consecutively by a depth view component in a second NAL unit for the temporal instance of the view of video data, wherein the texture view component comprises texture data for the temporal instance of a view and the depth view component comprising depth data corresponding to the texture data for the temporal instance of the view of video data, and wherein the view component the texture view component and the depth view component are separated in the common bitstream;
receive the depth data; and
separate the texture view component and the depth view component for the temporal instance of the view of video data based on:
a first indication that the first NAL unit includes the texture view component, the first indication being signaled in a five-bit field of a header of the first NAL unit, the five-bit field being associated with a NAL unit type of the first NAL unit, and
a second indication that the second NAL unit includes the depth view component, the second indication being signaled in a five-bit field of a header of the second NAL unit, the five-bit field being associated with a NAL unit type of the second NAL unit.

36. The computer program product of claim 35, wherein the texture data comprises coded slices of a coded frame of texture data and wherein the depth data comprises coded slices of a coded frame of depth data.

37. The computer program product of claim 35, wherein a delimiter NAL unit consecutively follows the first NAL unit that encapsulates the texture view component, and wherein the delimiter NAL unit is positioned immediately before the second NAL unit that encapsulates the depth view component in the common bitstream.

38. The computer program product of claim 35, further comprising instructions that cause the processor to obtain signaled camera parameters for one or more cameras related to views of video data in the bitstream, wherein the bitstream encapsulates SPS data structure including values indicative of intrinsic camera parameters shared by the views corresponding to the one or more cameras, the intrinsic camera parameters comprising one or more of focal length and principle point offset, extrinsic camera parameters shared by the views corresponding to the one or more cameras, and view-specific camera parameters including real-world horizontal locations of the one or more cameras.

39. The computer program product of claim 35, further comprising instructions that cause the processor to obtain signaled data representing conversion from real-world depth (z) values to depth values represented in the depth data as coded frames, wherein the data representing the conversion comprises data representing at least one of an indication of a linear function for converting the real-world depth (z) values to depth values of the depth view component, an indication of an inverse linear function for converting the real-world depth (z) values to depth values of the depth view component, data representing a range of the real-world depth (z) values, and an indication of a lookup table used to signal the real-word depth (z) values.

40. A device for processing video data, the device comprising:
means for receiving a common bitstream that includes a view component encapsulating a texture view component in a first network abstraction layer (NAL) unit for a temporal instance of a view of the video data followed consecutively by a depth view component in a second NAL unit for the temporal instance of the view of video data, wherein the texture view component comprises texture data for the temporal instance of a view and the depth view component comprising depth data corresponding to the texture data for the temporal instance of the view of video data, and wherein the texture view component and the depth view component are separated in the common bitstream;
means for receiving the depth data; and
means for separating the texture view component and the depth view component for the temporal instance of the view of video data based on:
a first indication that the first NAL unit includes the texture view component, the first indication being signaled in a five-bit field of a header of the first NAL unit, the five-bit field being associated with a NAL unit type of the first NAL unit, and
a second indication that the second NAL unit includes the depth view component, the second indication being signaled in a five-bit field of a header of the second NAL unit, the five-bit field being associated with a NAL unit type of the second NAL unit.

41. The device of claim 40, wherein the texture data comprises coded slices of a coded frame of texture data and wherein the depth data comprises coded slices of a coded frame of depth data.

42. The device of claim 40, wherein a delimiter NAL unit consecutively follows the first NAL unit that encapsulates the texture view component, and wherein the delimiter NAL unit is positioned immediately before the second NAL unit that encapsulates the depth view component in the common bitstream.

43. The device of claim 40, further comprising means for obtaining signaled camera parameters for one or more cameras related to views of video data in the bitstream, wherein the bitstream encapsulates SPS data structure including values indicative of intrinsic camera parameters shared by the views corresponding to the one or more cameras, the intrinsic camera parameters comprising one or more of focal length and principle point offset, extrinsic camera parameters shared by the views corresponding to the one or more cameras, and view-specific camera parameters including real-world horizontal locations of the one or more cameras.

44. The device of claim 40, further comprising means for obtaining signaled data representing conversion from real-world depth (z) values to depth values represented in the depth data as coded frames, wherein the data representing the conversion comprises data representing at least one of an indication of a linear function for converting the real-world depth (z) values to depth values of the depth view component, an indication of an inverse linear function for converting the real-world depth (z) values to depth values of the depth view component, data representing a range of the real-world depth (z) values, and an indication of a lookup table used to signal the real-word depth (z) values.

* * * * *